United States Patent
Maeda et al.

[11] Patent Number: 6,072,910
[45] Date of Patent: Jun. 6, 2000

[54] METHOD AND APPARATUS FOR CODING IMAGE INFORMATION, AND METHOD OF CREATING CODE BOOK

[75] Inventors: Mitsuru Maeda, Yokohama; Tadashi Yoshida, Ichikawa, both of Japan

[73] Assignee: Canon Kabushiki Kaisha, Tokyo, Japan

[21] Appl. No.: 08/236,103

[22] Filed: May 2, 1994

Related U.S. Application Data

[62] Division of application No. 08/003,874, Jan. 11, 1993, Pat. No. 5,341,441, which is a continuation of application No. 07/489,247, Mar. 5, 1990, abandoned.

[30] Foreign Application Priority Data

| Mar. 10, 1989 | [JP] | Japan | 1-56321 |
| Mar. 13, 1989 | [JP] | Japan | 1-57906 |
| Apr. 3, 1989 | [JP] | Japan | 1-81505 |

[51] Int. Cl.$^7$ .............................. G06K 9/38; G06T 9/00
[52] U.S. Cl. .......................................... 382/253; 348/422
[58] Field of Search ........................... 382/56, 240, 208, 382/250, 251, 253; 348/422, 417, 418, 398, 397; 358/433

[56] References Cited

U.S. PATENT DOCUMENTS

| 4,670,851 | 6/1987 | Murakami et al. | 348/418 |
| 4,691,329 | 9/1987 | Juri et al. | 382/248 |
| 4,853,779 | 8/1989 | Hammer et al. | 348/422 |
| 4,862,262 | 8/1989 | Tanaka | 348/422 |
| 4,943,855 | 7/1990 | Bheda et al. | 348/398 |
| 4,974,071 | 11/1990 | Maeda | 358/539 |
| 5,010,401 | 4/1991 | Murakami et al. | 348/417 |
| 5,162,923 | 11/1992 | Yoshida et al. | 358/432 |
| 5,194,950 | 3/1993 | Murakami et al. | 348/417 |
| 5,359,438 | 10/1994 | Maeda | 358/539 |

FOREIGN PATENT DOCUMENTS

| 62-25577 | 2/1987 | Japan | H04N 1/415 |
| 62-32785 | 2/1987 | Japan | H04N 7/137 |
| 62-139089 | 6/1987 | Japan | G06K 9/38 |
| 63-74268 | 4/1988 | Japan | H04N 1/41 |
| 63-86963 | 4/1988 | Japan | H04N 1/41 |
| 63-269682 | 11/1988 | Japan . | |
| 63-269683 | 11/1988 | Japan | H04N 1/41 |
| 63-269684 | 11/1988 | Japan . | |

OTHER PUBLICATIONS

Tocci et al. *Microprocessors and Microcomputers:Hardware and Software*. Prentice–Hall, New Jersey, pp. 59–60, 1987.

*Primary Examiner*—Jon Chang
*Attorney, Agent, or Firm*—Fitzpatrick, Cella, Harper & Scinto

[57] ABSTRACT

A coding apparatus divides digital image information into pixel blocks each having a size of m×n pixels, and subjects the image information to vector quantization in block units. The pixel blocks are orthogonally transformed and the characteristics and sequency components of the pixel blocks are detected. Each pixel block is divided into a plurality of sub-blocks in conformity with the detected sequency components. Respective ones of the plurality of divided and outputted sub-blocks are scalar-quantized into sub-vectors of a predetermined number of bits in conformity with the characteristics of the pixel blocks. Respective ones of the scalar-quantized values of the quantized sub-blocks are vector-quantized in conformity with the characteristics of the pixel blocks, these vector-quantized reproduction vector codes are combined and the result is subjected to further vector quantization.

5 Claims, 22 Drawing Sheets

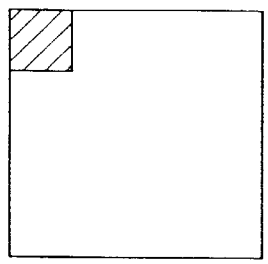
CLASS 1
(FLAT)
FIG. 4A
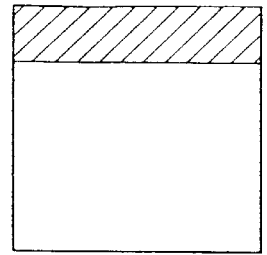
CLASS 2
(VERTICAL EDGE)
FIG. 4B
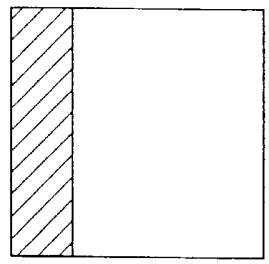
CLASS 3
(HORIZONTAL EDGE)
FIG. 4C
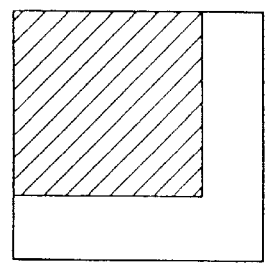
CLASS 4
(DIAGONAL EDGE)
FIG. 4D
| DC | BAND 1 |
|---|---|
| BAND 2 | |
| BAND 3 | |
| BAND 4 | |
CLASS 2 BAND DIVISION
FIG. 5
| 6 | 6 | 6 | 5 |
|---|---|---|---|
| 5 | 5 | 4 | 3 |
| 5 | 5 | 4 | 3 |
| 5 | 5 | 4 | 3 |
CLASS 2 SCALAR QUANTIZATION
FIG. 6

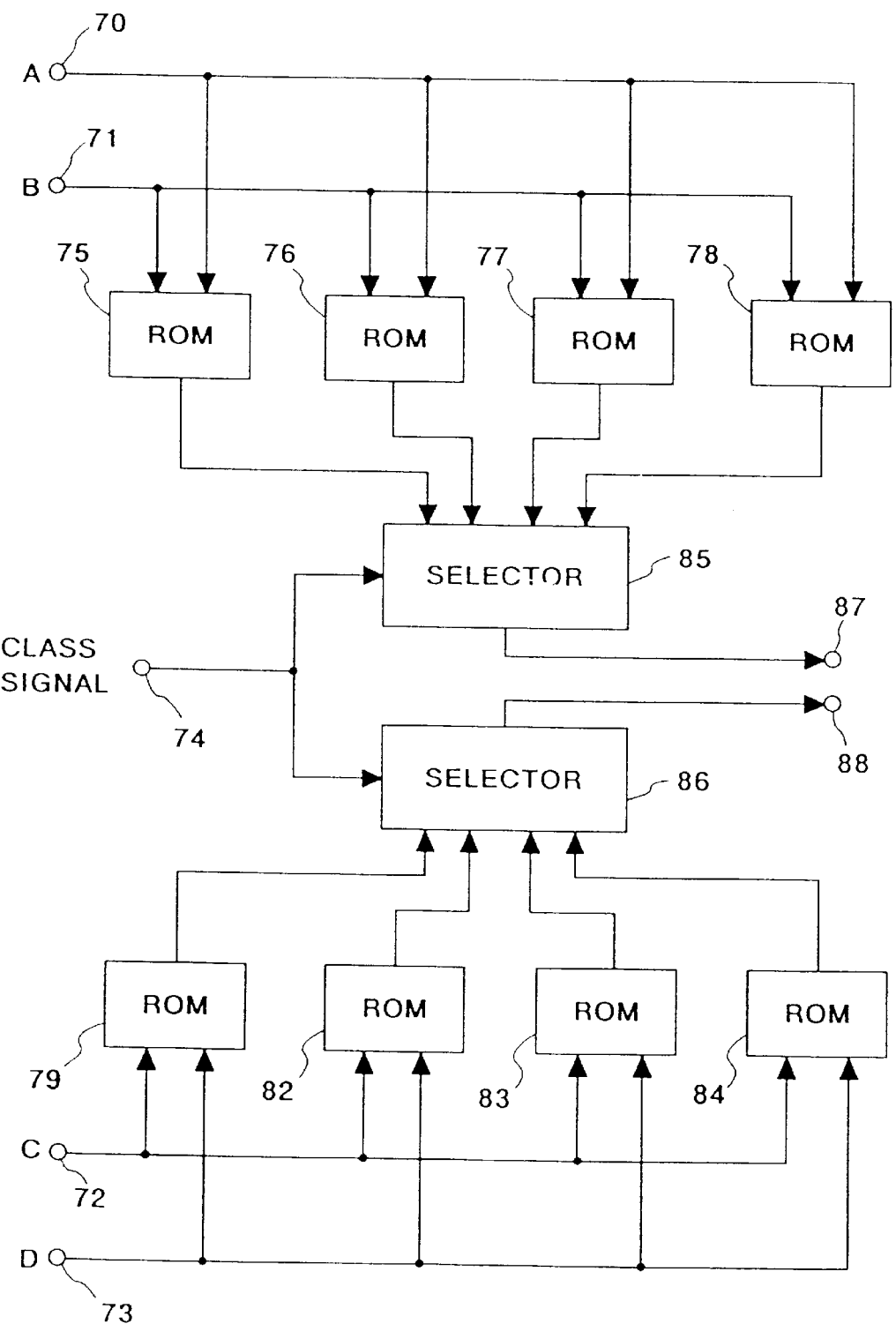
F I G. 13

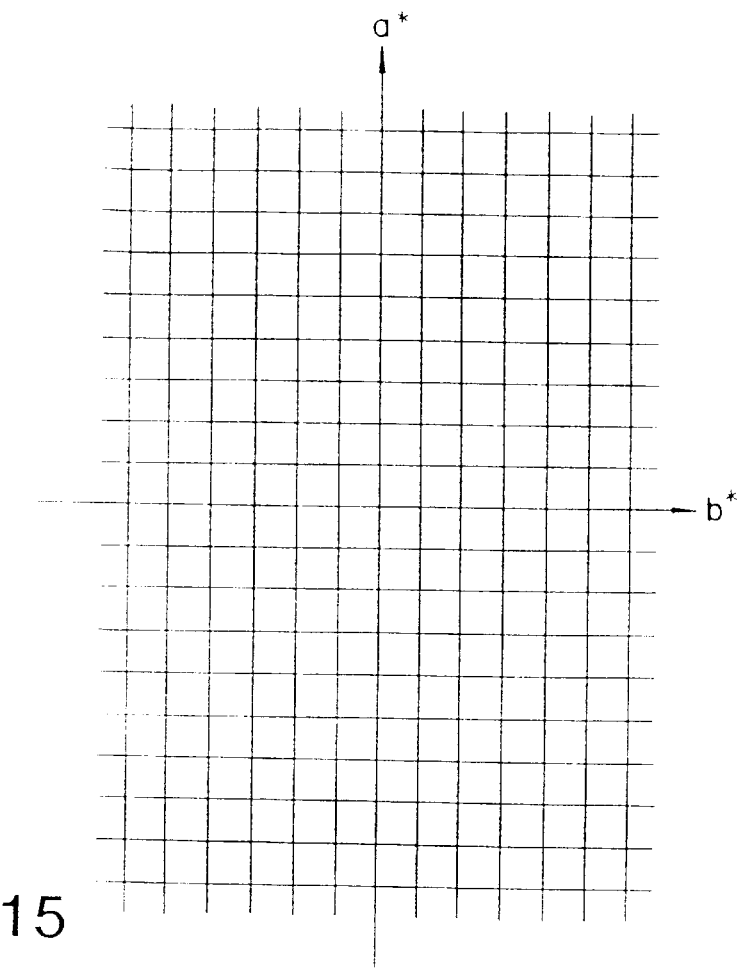
F I G. 15
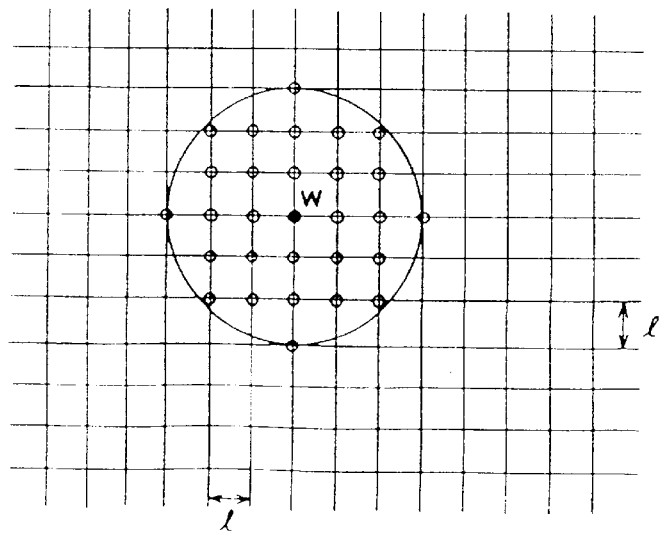
F I G. 16

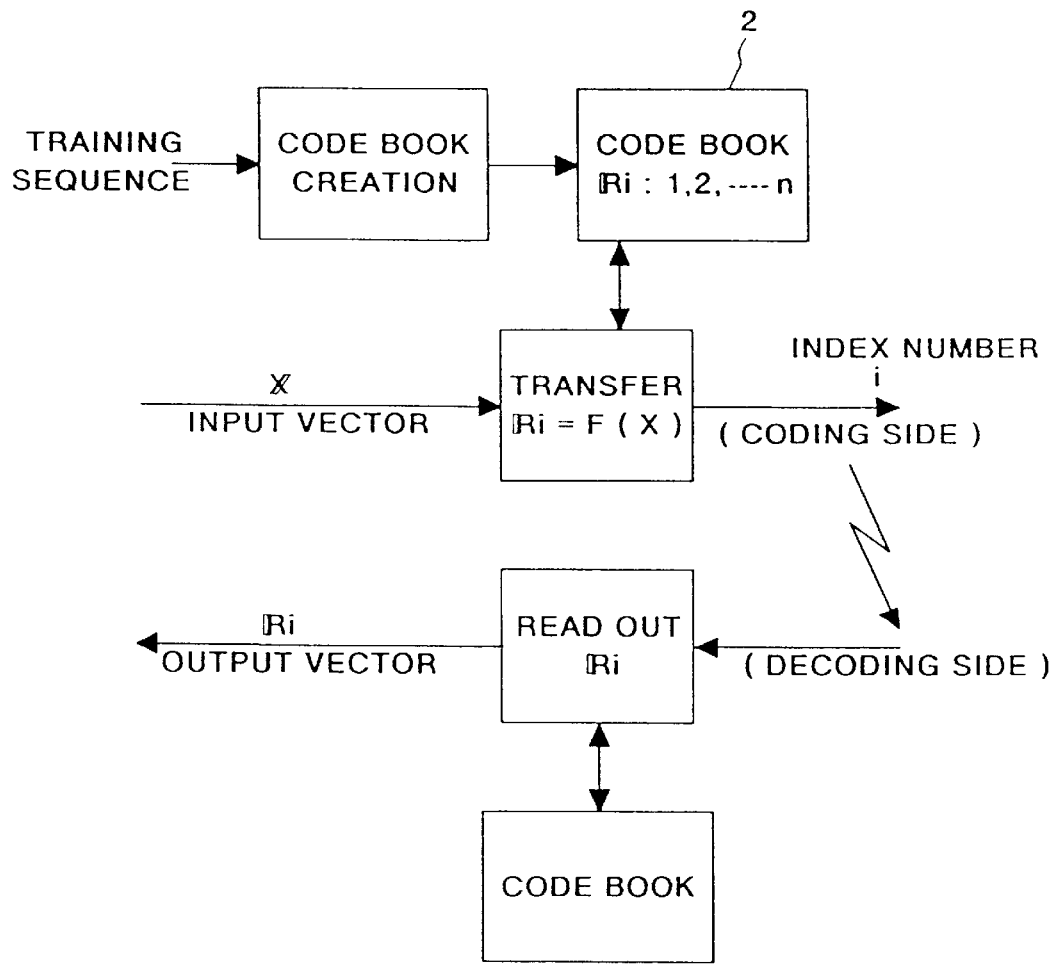
F I G. 19

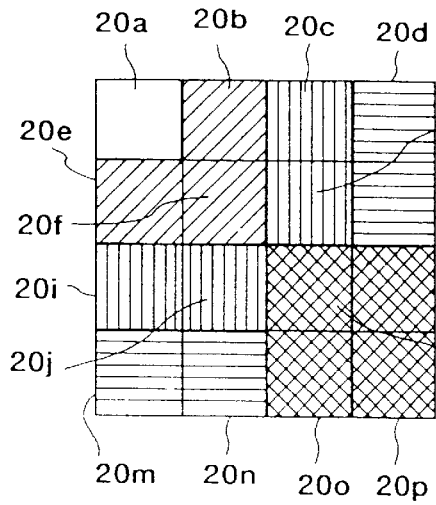
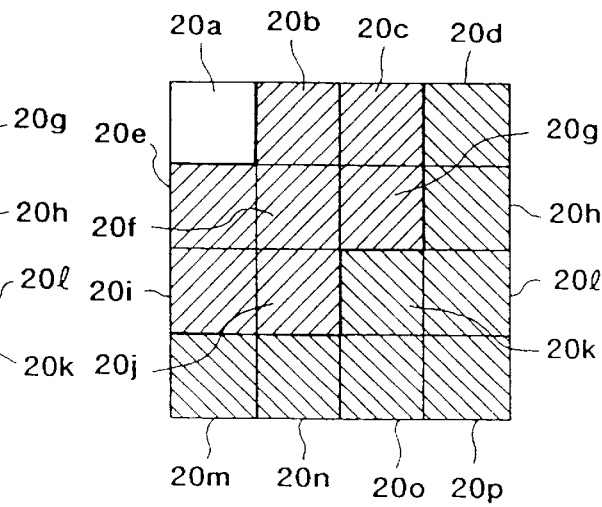
F I G. 20A     F I G. 20B
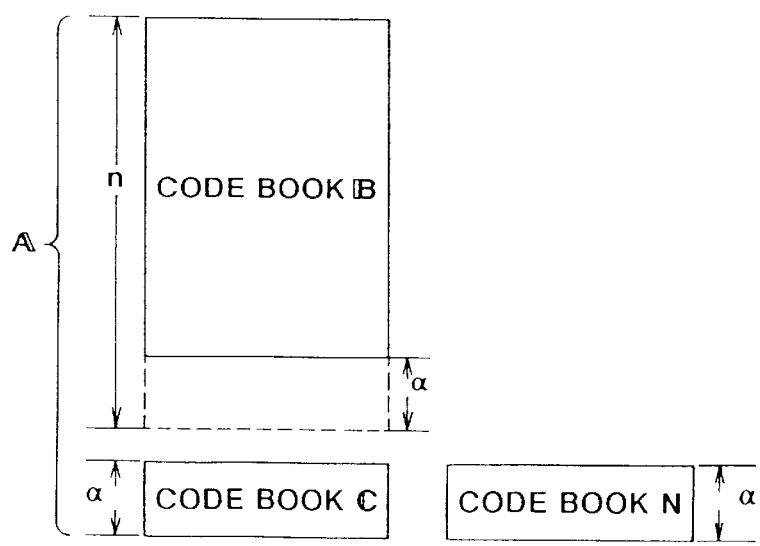
F I G. 27

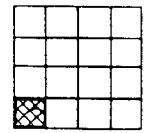
FIG. 25B(1)
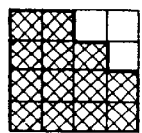
FIG. 25B(2)
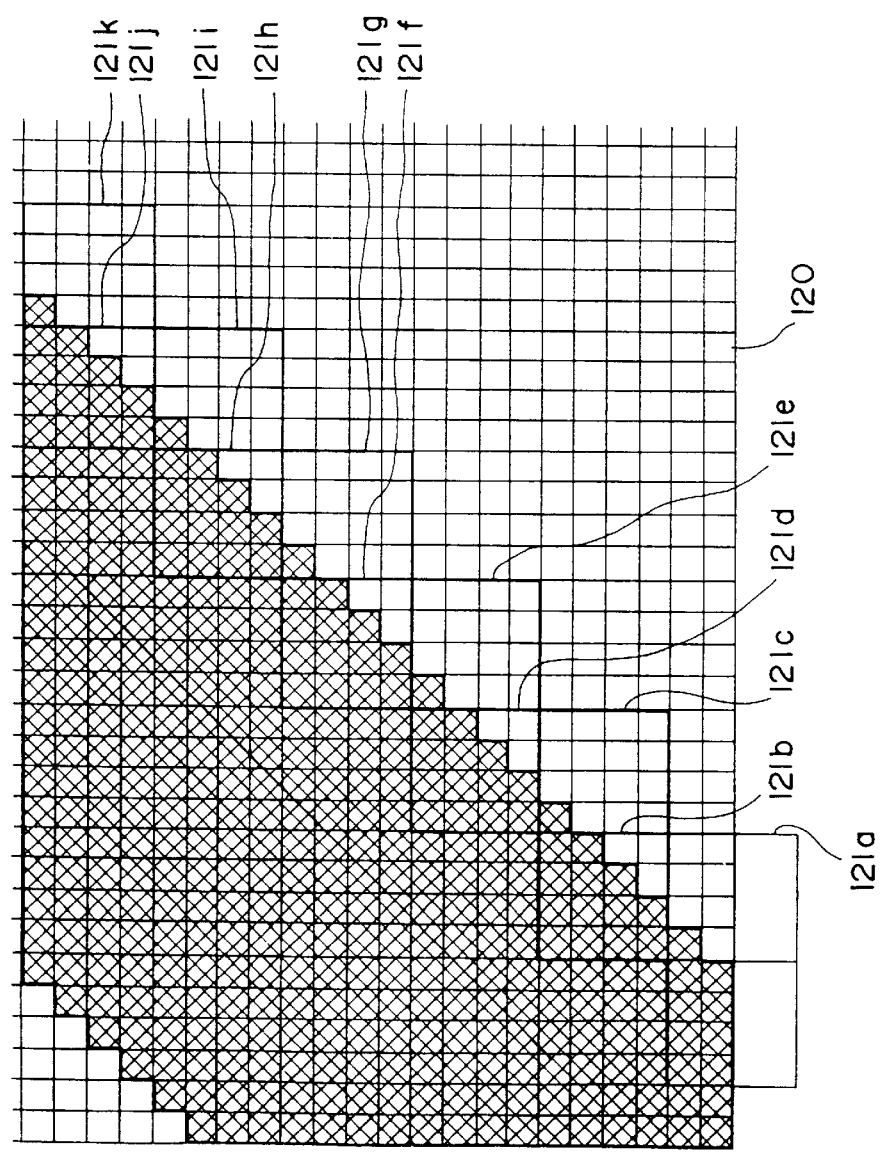
FIG. 25A

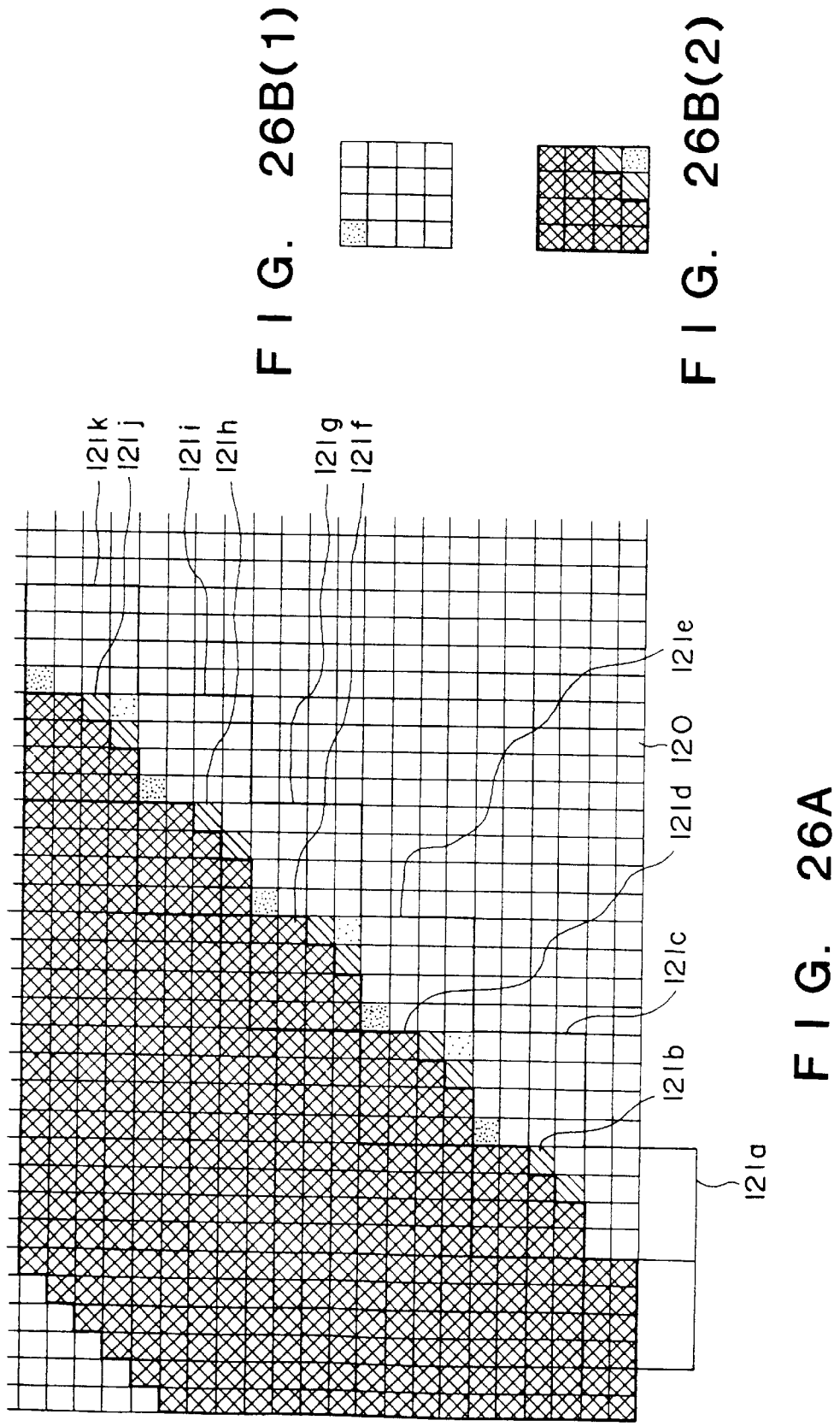

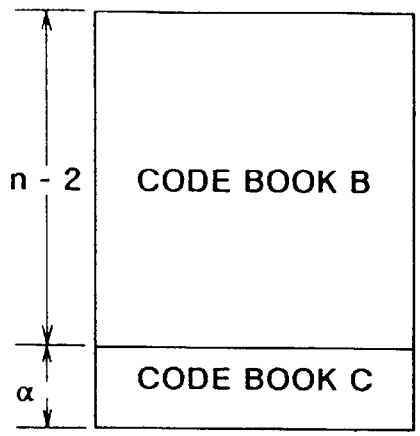
F I G. 29

METHOD AND APPARATUS FOR CODING IMAGE INFORMATION, AND METHOD OF CREATING CODE BOOK

This application is a division of application Ser. No. 08/003,874 filed Jan. 11, 1993, now U.S. Pat. No. 5,341,441, which was a continuation of application Ser. No. 07/489,247 filed Mar. 5, 1990, now abandoned.

BACKGROUND OF THE INVENTION

1. Field of the Invention

This invention relates to a method and apparatus for coding multivalued image data or color image data. More particularly, the invention relates to a coding method and apparatus for coding image information block by block, and subjecting the generated vector data to vector quantization to achieve coding.

2. Description of the Prior Art

Vector quantization has recently become the focus of attention as a method of achieving highly efficient image coding and entails regarding image information in a pixel block as a vector in terms of image block units, and obtaining an optimum reproduction vector for each and every pixel block. However, vector quantization involves certain problems, which will now be set forth.

The arrangement of a coder using conventional vector quantization is illustrated in FIG. 30A. Here the distances between an input vector and reproduction vectors that are contained in a code book stored in a memory 300 are computed by an arithmetic unit 301, the reproduction vector having the shortest distance is selected by a comparator 302 based on the results of the computation, and the code of this vector is delivered as an output.

However, with the arrangement (FIG. 30A) using the arithmetic unit, the higher the number of dimensions of the input vector, the larger the arithmetic circuit and comparator become. This leads to problems in terms of cost and speed.

Tree-search vector quantization is performed in the art in order to solve the problem. Tree-search vector quantization involves a search performed in stage-wise fashion in order to select a reproduction vector from a code book. This is done in the following manner, which serves as one example: First, the entire code book is divided into k groups, each of which usually is composed of vectors whose distances are close to one another. Each group has a representative vector, such as a center-of-gravity vector. Hence, k-number of these vectors are prepared and these are compared with the input vector to decide the group of vectors having the shortest distances relative to the input vector. The group decided is further divided into k groups and similar processing is executed to eventually retrieve the reproduction vector. Thus, with the tree-search vector quantization method, the amount of computation can be reduced since a comparison with the entire code book is not required in order to determine the optimum vector.

Though the amount of computation in the conventional tree-search vector quantization method is thus reduced in comparison with the complete look-up method, a drawback is that an optimum reproduction vector cannot always be obtained to retrieve, in stage-like fashion, a vector exhibiting little distortion. Furthermore, since there is no change in the dimensions of the input vector and the number of bits in each element, an enormous memory capacity is still required. As a result, this approach is not suited to a LUT arrangement.

Another arrangement shown in FIG. 30B is composed of a look-up table (hereinafter referred to as a "LUT"), in which vectors at the shortest distances with respect to input vectors are found in advance and stored in a memory 304. Then, when an input vector is given, the code of the reproduction vector is obtained from the LUT.

Such methods for processing color image are proposed in U.S. patent application Ser. No. 066,119 (filed Jun. 25, 1987), abandoned, U.S. Ser. No. 185,024 (filed Apr. 22, 1988), now U.S. Pat. No. 4,974,071, U.S. Ser. No. 261,276 (filed Oct. 24, 1988), abandoned, U.S. Ser. No. 312,755 (filed Feb. 21, 1989), now U.S. Pat. No. 5,162,923, U.S. Ser. No. 362,014 (filed Jun. 6, 1989), now U.S. Pat. No. 5,089,884, which were assigned to the assignee of the present invention. That is, by dividing color image data into a plurality of blocks in conformity with luminosity and chromaticity to achieve quantization, fairly good coding efficiency is obtained utilizing human visual characteristics with respect to luminosity and chromaticity.

FIG. 17 is a block diagram for describing one example of coding method of color image information proposed by the assignee of this invention. As shown in FIG. 17, a color converter 1 divides input image information R, G, B into respective blocks (each composed of 4×4 pixels, by way of example), and each block is converted into luminosity information L* and chromaticity information a*, b* in a uniform color space. Since the brightness information L* is visually sensitive, it is coded faithfully. In other words, the brightness information L* is subjected to an orthogonal transformation by an orthogonal transform unit 2, and the obtained vector having a 16-dimension structure is coded by a vector quantizer 3.

Meanwhile, the items of chromaticity information a*, b* can be further compressed since they are not visually sensitive. That is, the items of chromaticity information a*, b* are further divided into sub-blocks (each consisting of 2×2 pixels), the mean values in each sub-block are obtained, and the 8-dimension chromaticity vectors obtained are coded by a vector quantizer 6.

However, with the system employing the LUT (FIG. 30B), the problems related to cost and speed are solved but the following problems arise when the input vector takes on higher dimensions:

(i) In a case where the LUT of a multidimensional vector quantizer is of the complete look-up type, an exorbitant amount of processing time and hardware are required and therefore problems arise in terms of coding efficiency and cost.

(ii) Memory capacity is limited by the size of the elements, and constitution using a ROM or the like is difficult.

(iii) Correlation between vector elements cannot be utilized merely by setting a scalar quantizer in front of the LUT. The result is a decline in efficiency and image quality.

Thus, even with the LUT configuration said to be speedier than the arrangement using the arithmetic unit, problems remain in that there is a decline in processing speed, coding efficiency and image quality depending upon the input signal.

Vector quantization thus requires an operation through which vectors exhibiting minimum quantization distortion may be searched from among a group of predetermined reproduction vectors (i.e., a code book). Consequently, since the amount of computation grows exponentially the higher the dimensions of the vector and the larger the number of reproduction vectors, it is difficult to achieve high speed. In particular, when a vector quantization circuit is composed of hardware and it is attempted to realize complete look-up-type vector quantization using such a circuit, the memory capacity of the LUT must be enormous and therefore such an arrangement is unrealistic. For example, consider a LUT for quantizing one block composed of 4×4 pixels, in which each pixel is constituted by eight bits. In such case, the address space of the LUT would be 8 (bits)×4×4=128 (bits). This is not feasible.

On the other hand, when the above-described vector quantization is carried out, the general image (the training image) is sampled and use is made of a code book created by the LBG (Linde, Buzo, Gray) method or the like.

However, when the coding of the chromaticity information is performed solely by vector quantization, the reproduced chromaticity structure tends to become flat and color becomes indistinct especially at the edge portions of characters if use is made of a code book created employing the ordinary training image, which exhibits few color edges. If chromaticity structure information is furnished in order to solve this problem, code length increases.

With regard to the problem, it has also been contemplated to shorten code length by utilizing the interim results of tree search in conventional tree-search quantization. However, besides the fact that an optimum vector cannot always be obtained, code length cannot be increased to improve picture quality.

In addition, in order to select a vector from among a group of predetermined reproduction vectors by training, the length of the word to undergo coding is fixed. Consequently, when it is attempted to change the ratio of compression, since training must be performed anew and the hardware must also be changed, it is difficult to change the ratio of compression.

SUMMARY OF THE INVENTION

Accordingly, an object of the present invention is to provide an image information coding apparatus which utilizes the correlativity of image data to perform vector quantization of high image quality with a comparatively small look-up table.

According to the present invention, the foregoing objects are attained by providing a color image coding apparatus characterized by comprising extracting means for extracting frequency components every block composed of a plurality of pixels, dividing means for dividing the block into a plurality of sub-blocks in dependence upon the frequency components extracted by the extracting means, first quantizing means for performing vector quantization on every sub-block, and second quantizing means for performing further vector quantization in dependence upon correlation among the sub-blocks using results of quantization performed by the first quantizing means.

Another object of the present invention is to provide a coding apparatus in which a pixel block is divided into a plurality of sub-blocks and vector quantization is performed independently sub-block by sub-block, whereby the number of vector dimensions can be reduced and memory capacity diminished so as to enable a LUT or the like to be used.

According to the present invention, the foregoing objects are attained by providing a coding apparatus for vector-quantizing digital image information in block units, characterized by comprising dividing means for dividing a plurality of components constituting a pixel block into a plurality of sub-blocks, scalar quantizing means for scalar-quantizing the components of the sub-blocks, first vector quantizing means for vector-quantizing sub-blocks scalar-quantized by the first scalar quantizing means, and second quantizing means for performing further vector quantization in dependence upon correlation among the sub-blocks using results of quantization performed by the first vector quantizing means.

Still another object of the present invention is to provide a coding method and apparatus in which vector quantization is arranged to take place in a number of stages to solve the problems related to processing speed, coding efficiency and circuit size encountered in the conventional methods using an arithmetic unit or look-up table.

According to the present invention, the foregoing objects are attained by providing a coding apparatus for coding input image data of every block of a predetermined size characterized by comprising first quantizing means for vector-quantizing the input data and outputting 1-bit data, and second quantizing means for outputting m items of output data from the first quantizing means, performing further vector quantization, and outputting n-bit data (where n<1×m).

A further object of the present invention is to provide a coding apparatus in which vector quantization can be achieved with a small-scale arrangement and a method of making efficient code book by deleting, from a code book, unused vectors which appear by implementing vector quantization in a number of stages.

According to the present invention, the foregoing objects are attained by providing a coding system for subjecting each of p-dimensional input signal vectors and q-dimensional input signal vectors to vector quantization using first and second code books, respectively, and further quantizing a resultant vector, which is obtained by combining the two quantized results, by a third code book, a method of creating the third code book comprising, a first step of extracting reproduction vectors which, depending upon the quantization by the first and second code books, will not be used in the third code book, and a second step of deleting the extracted reproduction vectors from the third code book.

A further object of the present invention is to provide a color image coding method and apparatus capable of faithfully reproducing color edges without increasing code length.

A further object of the present invention is to provide an image information coding method and apparatus capable of enhancing reproduced image quality by increasing the number of usable reproduction vectors without increasing the code length of chromaticity signals.

According to the present invention, the foregoing objects are attained by providing an image coding apparatus for coding luminosity information and chromaticity information, which constitute color image information, for every block of a predetermined size, comprising, detecting means for subjecting the luminosity information to preprocessing and detecting features block by block, vector quantizing means having a plurality of code books for dividing each block into a plurality of sub-blocks and coding the chromaticity information sub-block by sub-block, and selecting means for selecting the code books in dependence upon the features detected by the detecting means.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIGS. 4A through 4D are diagrams illustrating an example of a class sorting method;

FIG. 5 is a diagram illustrating an example of band division (sub-block division) of class 2 in the first embodiment;

FIG. 6 is a diagram illustrating an example of a bit array according to scalar quantization of class 2;

FIG. 13 is a block diagram of a vector quantizer 27 (or 28);

FIG. 15 is a diagram illustrating an (a*,b*) plane, which is chromaticity information;

FIG. 16 is a diagram showing an example of representative color vectors in the second embodiment;

FIG. 19 is a block diagram for describing the concept of vector quantization utilized in third through fifth embodiments;

FIGS. 20A, 20B are diagrams for describing the concept of space division applied to the third through fifth embodiments;

FIGS. 25A, 25B, 26A, 26B are diagrams for describing the manner in which an edge portion is degraded when the technique of the fourth embodiment is not used;

FIG. 27 is a diagram showing the structure of vector quantization code books of the fourth embodiment of the invention;

FIG. 29 is a diagram showing the construction of code books used in the fifth embodiment of the invention.

DESCRIPTION OF THE PREFERRED EMBODIMENTS

Figure 1:
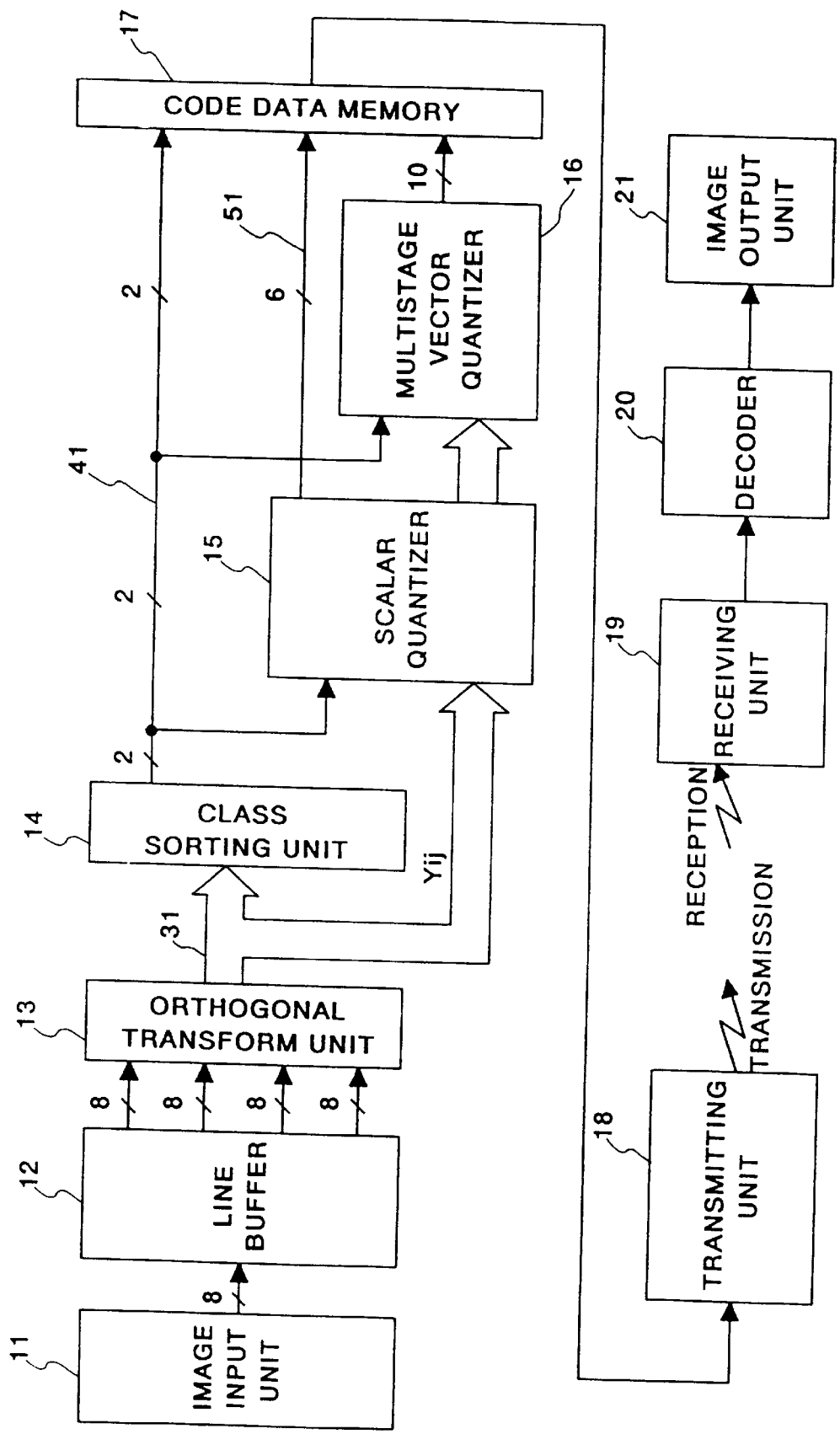
FIG. 1 is a block diagram illustrating the general construction of an image processing apparatus of a first embodiment.

Preferred embodiments of the present invention will now be described in detail with reference to the accompanying drawings.

Before discussing the preferred embodiments of the invention, the concept of vector quantization common to all of the embodiments will be discussed. This vector quantization is intrinsically outstanding coding which makes it possible to greatly improve upon quantization distortion in comparison with scalar quantization.

First, the concept of vector quantization will be described in simple terms in accordance with FIG. 19. Here an input signal is divided into blocks K by K, and the blocks are represented by a k-dimensional vector X for the sake of the description in FIG. 19. Vector quantization can be seen as a mapping on a set of N vector prepared in advance from X. These N vectors are referred to as output vectors, and the set thereof is referred to as a code book (or output vector set). FIG. 19 illustrates the basic constitution of vector quantization.

Assume now that the K samples of the input signal system are converted into blocks and made input vectors $X=(x_1, x_2, x_3, \ldots, x_k)$. The set of these vectors constitutes a K-dimensional euclidean signal space $R_k$. It will be assumed that the space $R_k$ is divided beforehand into n partial spaces $P_i$ by a predetermined algorithm (training). Let the vector constituting $P_i$ be known. A typical vector Ri of the partial spaces $P_1$ is selected as the vector constituting the partial spaces. Accordingly, if $$X \in P_1$$

holds, then the index (index number) thereof can express the input vector X. More specifically, by transmitting or storing i, compression/coding of the input signal becomes possible. On the decoding side, a K-dimensional vector $$Ri=(r_1, r_2, r_3, \ldots r_k)$$

stored at an i address of the same book on the decoding side is outputted as the reproduction vector of the input vector X /. The mapping F $$F:R_i=f(X)$$

of the kind $$X \rightarrow R_i$$

is referred to as vector quantization. This mapping is carried out so as to minimize distortion caused by mapping X on $R_i$. More specifically, the code book is generated so as to minimize mean distortion in accordance with a predetermined training sequence. Vector quantization is a technique for carrying out quantization in block units. It is known that the theoretical data compression limit is approached by enlarging the number of dimensions, namely block size. In addition, since quantization error is randomized, a high reproduction quality is obtained, considering the S/N ratio, in a case where an image signal is the object of processing.

A Hadamard transform used in the present invention will now be described. This Hadamard transform is a form of orthogonal transform, which is particularly well suited as a method of vector quantization preprocessing. This Hadamard transform is common to the embodiments described hereinbelow.

As an illustrative example, assume that the image to be coded is a black-and-white multivalued image, and that each pixel is composed of eight bits. The Hadamard transform is applied to blocks composed of 4×4 pixels, as shown for example in FIG. 20A. Here $x_{ij}$ (i=1 . . . 4, j=1 . . . 4) represents a pixel of the image. If $x_{ij}$ is represented using a matrix X, we have $$X = [X_{11}, X_{12}, X_{13}, X_{14}, X_{21}, X_{22}, X_{23}, X_{24}, X_{31}, X_{32}, X_{33}, X_{34}, X_{41}, X_{42}, X_{43}, X_{44}]^T \quad (1)$$

In the above equation, T indicates a transposed matrix. If we let $y_{ij}$ (i=1 . . . 4, j=1 . . . 4) represent the result of applying the Hadamard transform to X, a matrix Y represented by $y_{ij}$ will be as follows:

$$Y = [Y_{11}, Y_{12}, Y_{13}, Y_{14}, Y_{21}, Y_{22}, Y_{23}, Y_{24}, Y_{31}, Y_{32}, Y_{33}, Y_{34}, Y_{41}, Y_{43}, Y_{44}]^T \quad (2)$$

Accordingly, the transformation from matrix X to matrix Y is represented by Eq. (3) below.

$$Y = \left(\frac{1}{16}\right)^{1/2} \times H_{16} \times X \quad (3)$$

where $H_{16}$ is a 16-dimension Hadamard matrix, which is represented by the following equation:

$$H_{16} = \begin{vmatrix} 1 & 1 & 1 & 1 & 1 & 1 & 1 & 1 & 1 & 1 & 1 & 1 & 1 & 1 & 1 & 1 \\ 1 & 1 & -1 & -1 & 1 & 1 & -1 & -1 & 1 & 1 & -1 & -1 & 1 & 1 & -1 & -1 \\ 1 & -1 & -1 & 1 & 1 & -1 & -1 & 1 & 1 & -1 & -1 & 1 & 1 & -1 & -1 & 1 \\ 1 & -1 & 1 & -1 & 1 & -1 & 1 & -1 & 1 & -1 & 1 & -1 & 1 & -1 & 1 & -1 \\ 1 & 1 & 1 & 1 & 1 & 1 & 1 & 1 & -1 & -1 & -1 & -1 & -1 & -1 & -1 & -1 \\ 1 & 1 & -1 & -1 & 1 & 1 & -1 & -1 & -1 & -1 & 1 & 1 & -1 & -1 & 1 & 1 \\ 1 & -1 & -1 & 1 & 1 & -1 & -1 & 1 & -1 & 1 & 1 & -1 & -1 & 1 & 1 & -1 \\ 1 & -1 & 1 & -1 & 1 & -1 & 1 & -1 & -1 & 1 & -1 & 1 & -1 & 1 & -1 & 1 \\ 1 & 1 & 1 & 1 & -1 & -1 & -1 & -1 & -1 & -1 & -1 & -1 & 1 & 1 & 1 & 1 \\ 1 & 1 & -1 & -1 & -1 & -1 & 1 & 1 & -1 & -1 & 1 & 1 & 1 & 1 & -1 & -1 \\ 1 & -1 & -1 & 1 & -1 & 1 & 1 & -1 & -1 & 1 & 1 & -1 & 1 & -1 & -1 & 1 \\ 1 & -1 & 1 & -1 & -1 & 1 & -1 & 1 & -1 & 1 & -1 & 1 & 1 & -1 & 1 & -1 \\ 1 & 1 & 1 & 1 & -1 & -1 & -1 & -1 & 1 & 1 & 1 & 1 & -1 & -1 & -1 & -1 \\ 1 & 1 & -1 & -1 & -1 & -1 & 1 & 1 & 1 & 1 & -1 & -1 & -1 & -1 & 1 & 1 \\ 1 & -1 & -1 & 1 & -1 & 1 & 1 & -1 & 1 & -1 & -1 & 1 & -1 & 1 & 1 & -1 \\ 1 & -1 & 1 & -1 & -1 & 1 & -1 & 1 & 1 & -1 & 1 & -1 & -1 & 1 & -1 & 1 \end{vmatrix}$$

Figure 2:
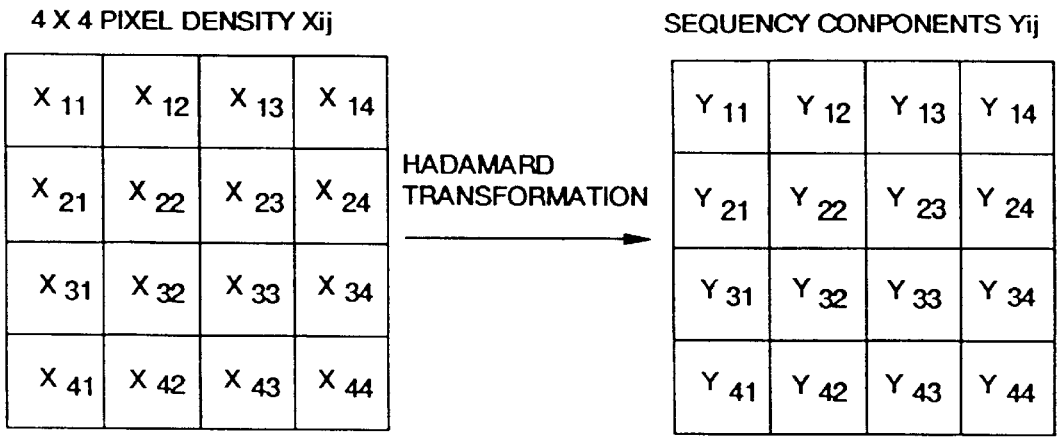
FIG. 2 is a diagram showing image data inputted to an orthogonal transform unit and vector data (sequency components) after transformation.

Components of Y in equation 3 (i.e., $y_{11}, y_{22}, \ldots y_{44}$) obtained by applying the Hadamard transform to a 4×4 pixel block are referred to as sequencies. The Hadamard transformation for a 4×4 pixel block is illustrated in FIG. 2. Thus, 16 sequencies are obtained with regard to a 4×4 pixel block. Among these, $y_{11}$ component or sequency of the Y matrix is a DC component, and the remaining 15 AC components are the object of quantization.

In quantizing the 15 sequencies by utilizing the conventional LUT configuration, it is required that the LUT employ a memory in which the amount of information used as addresses is 10 (bits)×15=150 (bits)

assuming that the amount of information per sequency is 10 bits, by way of examples. This leads to a great increase in the size of the circuitry, as mentioned earlier. Accordingly, in the embodiments described below, the input vector space is divided into partial vector spaces. The reasons are as follows: If sequency indicates the power of a frequency and an orthogonal transform serving as preprocessing is the Hadamard transform, then a 4×4 sequency will be such that the upper left tends to indicate low frequency and the lower right high frequency. In addition, there is a tendency for the variances to become equal at a location where the sequencies are near in terms of frequency. Therefore, in order to perform vector quantization, forming a new vector and carrying out quantization at such a location is suitable. In other words, if new vectors are formed upon making a division into high- and low-frequency portions, the dynamic range of these new vectors will draw near; hence, quantization distortion will be small even if these vectors are subjected to vector quantization.

A first embodiment of the present invention is adapted to provide highly efficient coding, which readily lends itself to hardware, by making maximum use of the correlativity of image data. In order to utilize image data correlativity and raise coding efficiency by vector quantization, image block size must be enlarged to some extent. However, when it is attempted to quantize a large block into vectors as it is, the LUT arrangement having the foregoing problems cannot be employed. Accordingly, the block is divided into a plurality of sub-blocks, and vector quantization is performed independently for each and every sub-block, whereby the number of vector dimensions can be decreased and memory capacity reduced to make possible use of the LUT arrangement.

Even when vectors (hereinafter referred to as sub-vectors) obtained by division into sub-blocks are quantized, the efficiency of vector quantization rises as the number of vector dimensions becomes higher. However, when division is performed so as to raise the number of sub-vector dimensions, the above-described problem related to adopting the LUT arrangement, namely the problem of enlarged memory capacity, is encountered again.

Therefore, in accordance with the first embodiment, scalar quantization is performed where suitable prior to vector quantization in order to subject the sub-vectors to vector quantization efficiently. This is the approach used to solve the foregoing problem. More specifically, by performing scalar quantization in such a manner that the total number of bits of the sub-vector components after scalar quantization become the same, subsequent vector quantization is carried out highly efficiently.

Furthermore, the present embodiment takes the correlativity of the image data into consideration and vector-quantifies, into a single code, the data independently coded sub-block by sub-block. In other words, multistage vector quantization is carried out. In this way it is possible to realize heretofore unobtainable efficient coding with a small memory capacity. This enables the LUT arrangement to be adopted. Since an optimum reproduction vector is obtained in each stage of the multistage vector quantization, code length can be changed and image quality enhanced by selecting the quantized results of each stage and performing coding.

[Description of Image Processing Apparatus (FIG. 1)]

FIG. 1 is a block diagram illustrating the general construction of an image processing apparatus of a first embodiment.

As shown in FIG. 1, numeral 11 denotes an image input unit for reading in, by means of raster scanning, multivalued image data comprising 16 pixels/mm, in which each pixel is composed of eight bits. Four lines of the series of the raster-inputted pixel data comprising the 8-bit pixels are outputted in parallel fashion by a line buffer in such a manner that the pixel data can be orthogonally transformed into 4×4 pixel block units by an orthogonal transform unit 13. In the present embodiment, the latter performs a 4×4 Hadamard transformation for transforming the 4×4 pixel data into an orthogonal transformation region.

[Description of Orthogonal Transformation Concept and Basic Function (FIGS. 2–4)]

Figure 3:
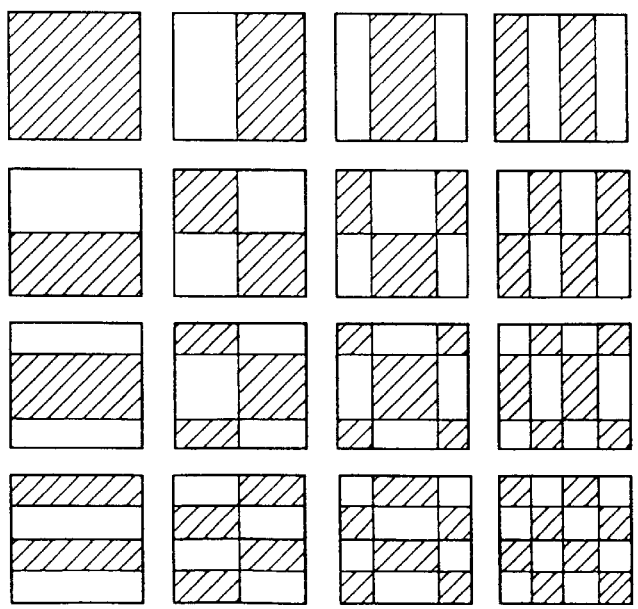
FIG. 3 is a diagram illustrating a two-dimensional Walsh transform pattern employed in a Hadamard transform of the embodiment.

FIG. 2 is a diagram showing the concept of an orthogonal transform (the Hadamard transform in this embodiment), and FIG. 3 shows, in diagrammatical form, a basic attributes of each sequency component. FIG. 3 shows the sequency components in a visual format. The uppermost left block shows a flat frequency component (CD component) corresponding to Y11 in FIG. 2. The lowest rightmost block with the most changes corresponds to Y44 of FIG. 2 and represents the highest frequency component.

By virtue of an orthogonal transformation, an information source having a high correlativity, such as an image, exhibits a property in which electric power concentrates in low sequencies. Accordingly, in this embodiment, sequency components (hereinafter referred to as orthogonal transform coefficients) obtained by orthogonal transformation are subjected to vector quantization, whereby quantization efficiency is raised. In FIG. 1, numeral 14 denotes a class sorting unit which examines the distribution of orthogonal transform coefficients every block (4×4 pixels) and sorts the classes thereof according to the properties of the image data.

FIG. 4 is a diagram showing the class sorting method used in the class sorting unit 14.

In a case where the image data has been orthogonally transformed, the positions of sequency components ($Y_{ij}$) (FIG. 2) having large values in a block change depending upon the image characteristics. For example, in case of image data having a steep edge in the vertical direction, a large sequency component (power) concentrates in the shaded portion shown in FIG. 4B. Similarly, a large sequency component concentrates in the shaded portion shown in FIG. 4C in case of image data having a steep edge in the horizontal direction of the image data, and a large sequency component concentrates in the shaded portion shown in FIG. 4D in case of image data having a steep edge in the diagonal direction of the image data. In addition, power concentrates solely in the low-frequency portion, as shown in FIG. 4A, with regard to an image which does not contain an edge portion. In this embodiment, an inputted image block is sorted into one of these four classes and the blocks are independently vector-quantized, as shown in FIG. 4, thereby raising the efficiency of vector quantization.

[Description of Quantization (FIGS. 5 and 6)]

FIG. 5 is a diagram illustrating an example in which an orthogonally transformed block of class 2 (FIG. 4B) is divided into sub-blocks and quantized.

In the case where the orthogonally transformed block has the vertical edge of FIG. 4B (class 2), the block is divided into bands, as shown in FIG. 5. Among these, a DC component is scalar-quantized independently and the other four bands are vector-quantized independently, thereby making it possible to achieve construction using the LUT (look-up table) arrangement. The other classes are similarly divided into sub-blocks comprising a DC component (DC) and four bands (not shown for the other classes).

The sub-blocks divided into bands by the class sorting unit 14 are inputted to a scalar quantizer 15 in FIG. 1, which proceeds to subject these sub-blocks to scalar quantization.

FIG. 6 illustrates an example of numbers of scalar-quantized bits in the case of the block with the vertical edge (class 2) shown in FIG. 5. Each numeric value in FIG. 6 indicates the number of bits allotted to each pixel. By distributing bits as shown in FIG. 6, the number of bits (17 in this example) of each band with the exception of DC are limited to the number of address lines of the ROM (LUT), thereby making possible vector quantization by a LUT·ROM arrangement. It should be noted that scalar quantization can be linear quantization or non-linear quantization.

Figure 7:
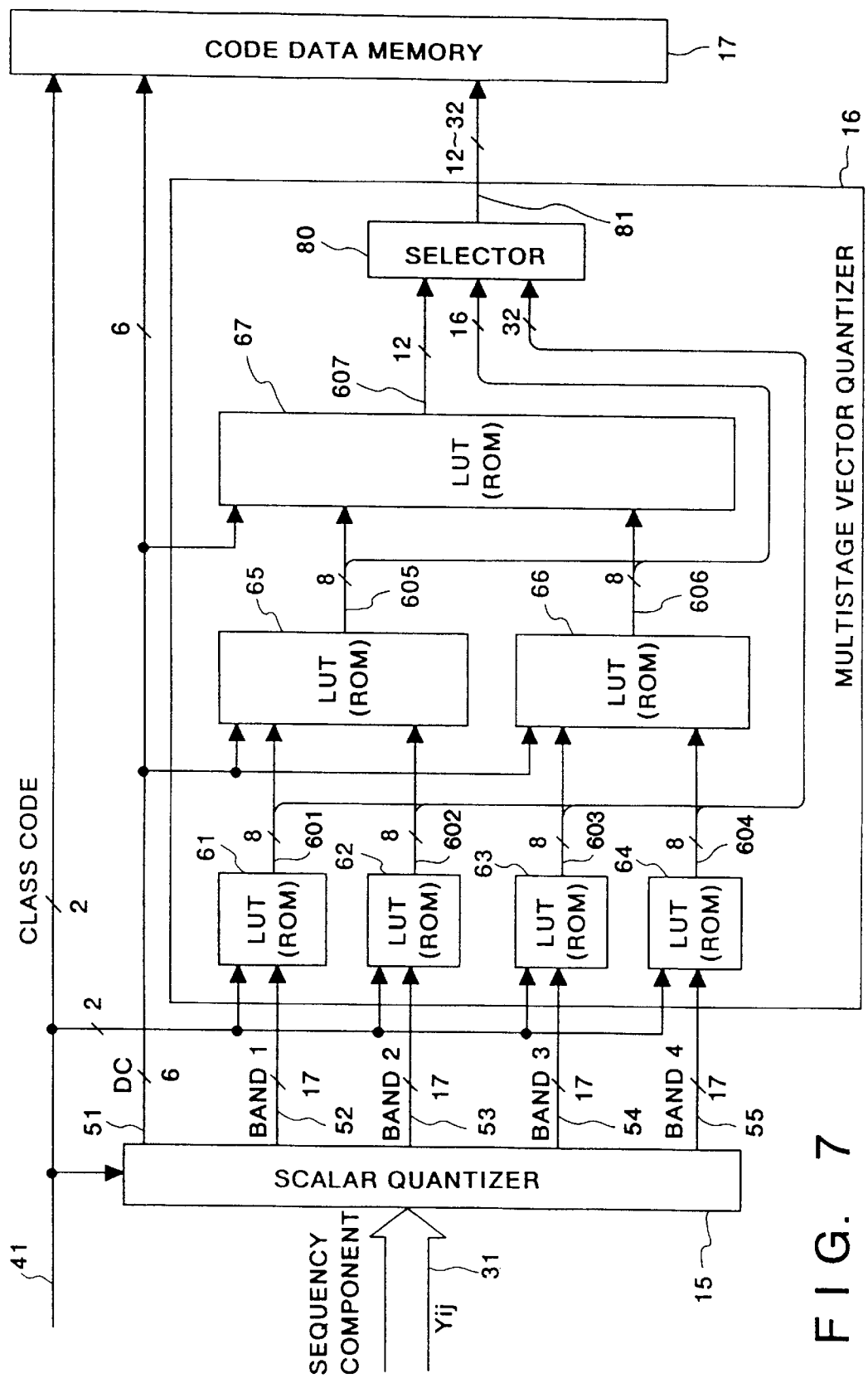
FIG. 7 is a block diagram showing the details of a multistage vector quantization circuit.

FIG. 7 is a block diagram showing the connections between the scalar quantizer 15 and the multistage vector quantizer 16, as well as the general construction of the multistage vector quantizer 16.

The sequency components $Y_{ij}$ (i=1, 2, 3, 4; j=1, 2, 3, 4) orthogonally transformed by the orthogonal transform unit 13 are inputted to the scalar quantizer 15. Each of the orthogonally transformed sequency components $Y_{ij}$ is composed of ten bits, but these are scalar-quantized by the scalar quantizer 15 to the bit numbers shown in FIG. 6. Thus, the DC component is scalar-quantized to six bits and is transferred via a signal line to a code data memory 17 where it is stored. The other sequency components $Y_{ij}$ (with the exception of $Y_{11}$) are scalar-quantized in accordance with the band division of FIG. 5 in such a manner that each band will have 17 bits.

These quantized signals enter, via band signal lines 52, 53, 54, 55, as the addresses of ROMs 61–64 storing LUTs for vector quantization. The class codes sorted by the class sorting unit 14 enter the two higher-order address bits of the ROMs 61–64. Accordingly, the signals which enter as the addresses of the ROMs 61–64 are each composed of 19 bits.

By thus making the numbers of bits (17 bits) of every band quantized by the scalar quantizer 15 the same, the memory spaces (4 megabytes) of the ROMs 61–64 can be used effectively. If will suffice if reproduction codes for the purpose of vector quantization are obtained independently for each and every ROM by performing training beforehand with regard to a large quantity of image data, and then put into LUT form. For example, an optimum reproduction vector can be designed by the LBG method or the like. In addition, scalar quantization error can be minimized at the time of training by carrying out class sorting but not scalar quantization. Thus, the items of band information are subjected to vector quantization in the ROMs 61–64, and the results of this vector quantization are outputted by these ROMs as codes on respective signal lines 601–604, with there being eight bits (256 vectors) on each line.

The operation described above represents the first stage of vector quantization. LUTs for the second stage of vector quantization are stored in ROMs 65, 66. Reproduction vectors are obtained by performing training, just as in the case of the ROMs 61–64, with regard to sequency components in which bands 1 and 2 are included, and the resulting vector information is stored in ROM 65. By independently obtaining reproduction vectors without performing scalar quantization and the first stage of vector quantization at the time of training, scalar quantization error is reduced, just as in the first stage of quantization, and error in the first stage of vector quantization can also be minimized. Similarly, reproduction vectors including bands 3 and 4 are obtained (256 vectors, eight bits) by training, and these are stored in advance.

Thus, codes 601, 602 and 603, 604 that are the results of vector quantization applied in the previous stage (first stage) are inputted to the respective ROMs 65, 66 in which are stored LUT values for obtaining the reproduction vectors. The results of the second stage of vector quantization by the ROMs 65, 66 enter as the addresses of a third-stage vector quantization ROM 67 via signal lines 605, 606, respectively.

In the third stage of vector quantization, the sequency components containing all bands, namely 15-dimensional vectors with the exception of the DC component, are subjected to training independently to obtain 4096 reproduction vectors (12 bits). The contents of the ROM 67 form a LUT which outputs the third stage of vector quantization from the second stage of vector quantization. This output is composed of 12 bits.

By thus performing vector quantization with a multistage arrangement composed of LUT·ROMs, the problems of vector quantization which could not be realized with a ROM arrangement in the prior art are solved. In addition, the code length of vector quantization can be varied by independently designing the vector quantization reproduction vectors in each stage.

With reference again to FIG. 7, there is shown a selector 80 which selects the code length in each stage. More specifically, the selector 80 is adapted to select a code of eight bits×(4 bands)=32 bits resulting from the first stage of vector quantization, a code of eight bits×(two bands)=16 resulting from the second stage of vector quantization, or a code of 12 bits×(one band)=12 bits resulting from the third stage of vector quantization.

Accordingly, in this embodiment, the vector quantization code quantity per block can be varied to consist of 32 bits, 16 bits or 12 bits. Thus, by including the two bits of the class code and the six bits of the DC component (for a total of eight bits) for all classes, the output code can be selected to be composed of 40 bits, 24 bits or 20 bits, and image quality can be controlled by this code selection. A code 81 selected by the selector 80, a DC component code 51 and a class code 41 are stored in a code data memory 17 as compressed codes.

The compressed codes stored in the code data memory 17 are read out under the control of a CPU (not shown), and the read codes are delivered to a transmission unit 18. The compressed codes delivered to the transmission unit 18 are transmitted by a digital pay station line or by satellite communication.

A compressed code received at a receiving unit 19 is decoded in a decoding unit 20. The latter performs decoding by referring to a code book whose content is the same as that of the code book used at the time of coding. The decoding unit 20 can be constituted by memory means such as a ROM in which the results of reference are stored in advance.

The image data decoded by the decoding unit 20 are outputted by an image output unit 21. The latter can be a soft copy such as a display or a hard copy such as a print-out. By way of example, the printer can be a color laser beam printer, a color ink jet printer or a color thermal transfer printer. The data compression according to the present invention is particularly effective in a case where it is necessary for the image data to be retained in a printer recording in a sheet sequence (e.g., the order Y, M, C, Bk).

[Modification of First Embodiment (FIG. 8)]

In the first embodiment set forth above, image data are subjected to a Hadamard transformation and sequency components are subjected to multistage vector quantization. However, the invention can be arranged in entirely the manner using other orthogonal transforms, such as a discrete cosine transform or K-L (Karhunen-Loeve) transform.

Figure 8:
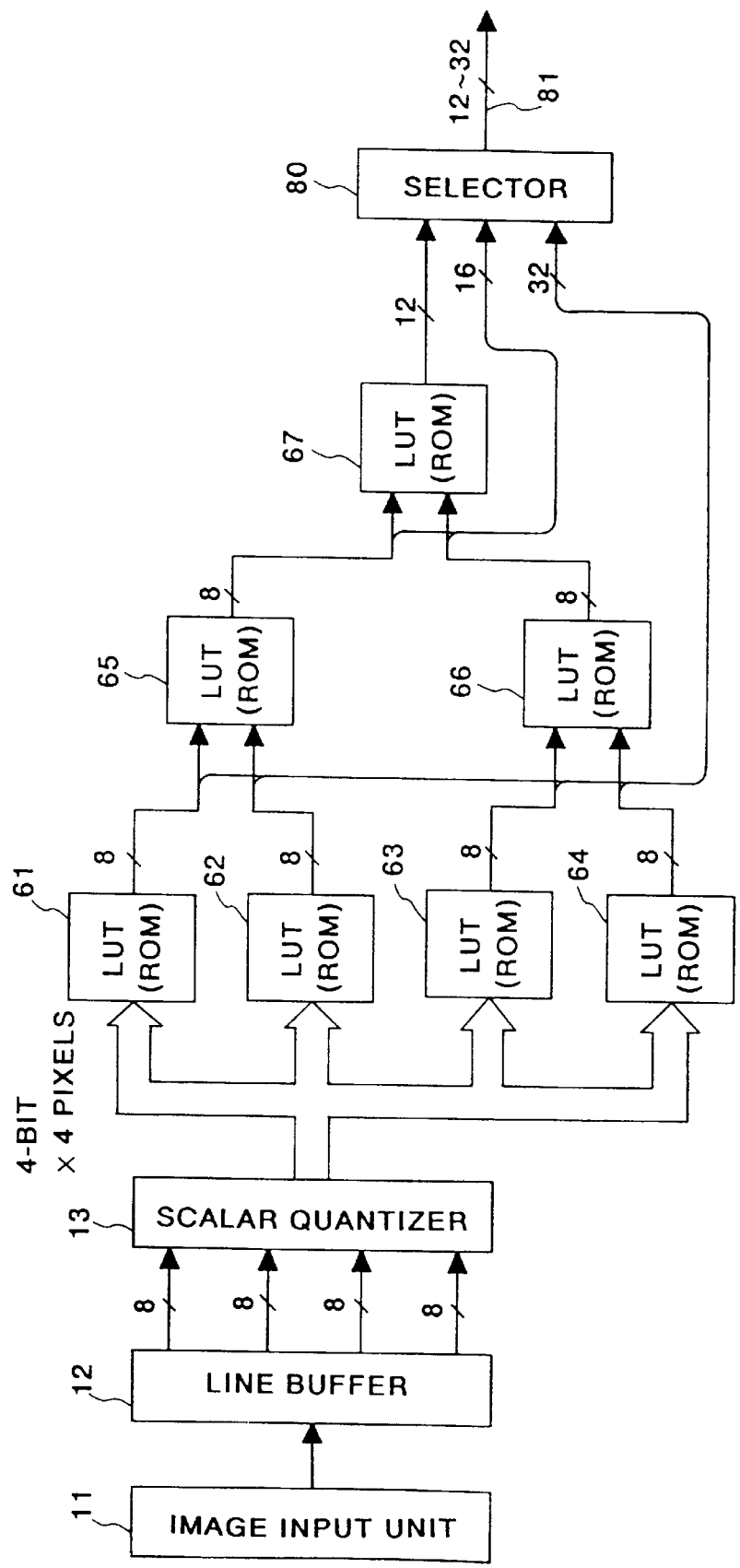
FIG. 8 is a block diagram showing the construction of a multistage vector quantization circuit according to another embodiment.

Further, image data can be subjected to multistage vector quantization directly without applying an orthogonal transform. Such an example is illustrated in FIG. 8. Here the image input unit 11 and line buffer 12 are the same as those shown in FIG. 1. The image data divided every four lines by the line buffer 12 enter the scalar quantizer 15 directly without undergoing orthogonal transformation. The scalar quantizer 15 scalar-quantizes the image data non-linearly every block of 4×4 pixels, and converts the image data into image data in which each pixel is composed of four bits. Four sub-blocks, each of which is composed of (4 bits/pixel)×4 pixels, enter as the addresses of respective ROMs 61, 62, 63, 64 for the first stage of vector quantization. Each sub-block is outputted upon being converted into an 8-bit code by the table information stored in the ROMs 61–64.

Figure 12:
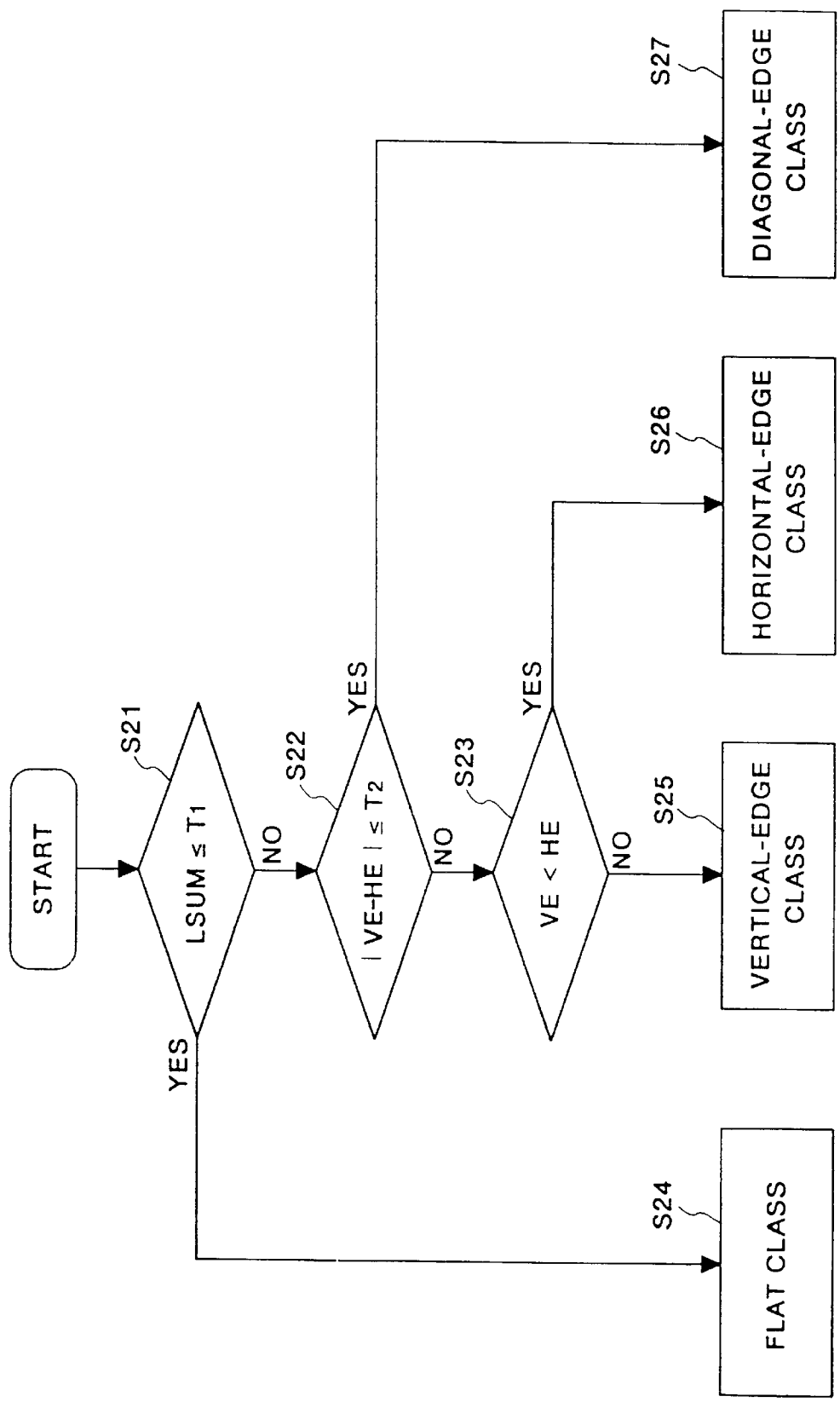
FIG. 12 is a flowchart illustrating classification processing in the second embodiment.

With regard to the second and third stages of vector quantization, ROMs 65, 66 and 67 are used, exactly as in the case of FIG. 7, and 12-bit quantized data are eventually obtained from the ROM 67. Image quality can be controlled just as in the case where orthogonal transformation was applied by selecting the codes in each stage, namely the 32 bits of the first stage, the 16 bits of the second stage or the 12 bits of the third stage, by means of the selector 80.

In accordance with the first embodiment, as described above, the LUT arrangement employing ROMs, in which difficulty is encountered when vector-quantizing image data in the prior art, is made feasible by stage-wise vector quantization. Further, by coding the results of vector quantization in each stage, selecting the codes and outputting them, the number of bits in image coding can be selected and, at the same time, the image quality of the coded image can be enhanced.

Furthermore, in the present invention, correlativity is taken into account and data coded independently sub-block by sub-block are vector-quantized to one code. In other words, by employing multistage vector quantization, coding efficiency not obtainable heretofore can be realized by a LUT arrangement with a small memory capacity, by way of example.

Moreover, since the optimum reproduction vector is obtained in each stage of the multistage vector quantization, code length can be increased and image quality changed by coding the quantized results of each stage.

A second embodiment in which coding according to the present invention is applied to color image data will now be described.

[Second Embodiment]

Figure 9:
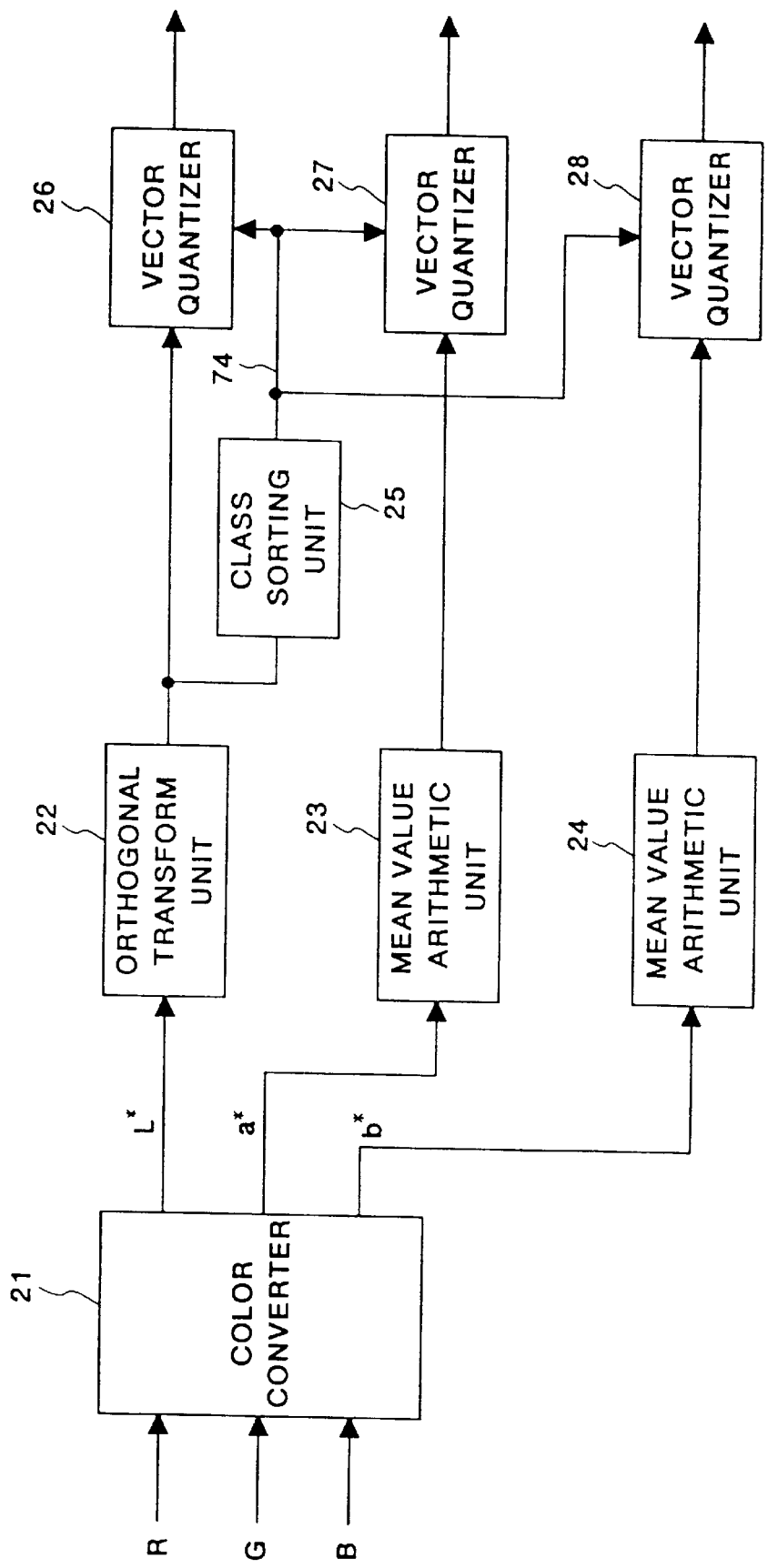
FIG. 9 is a block diagram illustrating a image processor of a second embodiment.

FIG. 9 is a block diagram of a color image processing unit according to a second embodiment. To simplify the description, it will be assumed in this embodiment that the color image signals are R, G, B, and that the size of the image blocks is (4×4) pixels.

In FIG. 9, numeral 21 denotes a color converter for dividing the inputted image signals R, G, B into pixel blocks and converting these into a pixel block of a luminosity signal L* and pixel blocks of chromaticity signals a*, b* in CIE uniform color space. Numeral 22 denotes an orthogonal transform unit for obtaining a sequency (structural information) regarding the luminosity block L* using a (4×4) Hadamard transform unit or the like. Numerals 23, 24 denote mean value arithmetic units for further dividing the chromaticity blocks a*, b* into sub-blocks of (2×2) pixels each, and for calculating the mean value of each sub-block. Numeral 25 denotes a class sorting unit for determining, based on the sequency outputted by the orthogonal transform unit 22, whether the structure of the luminosity in each block belongs to the "flat" class, "vertical-edge" class, "horizontal-edge" class or "diagonal-edge" class, as mentioned above. Numeral 26 designates a vector quantizer which, based on a class signal 74 outputted by the class sorting unit 25, codes sequency vectors (16 dimensions) regarding the luminosity block L*. Numeral 27 denotes a vector quantizer which, based on the class signal 74 outputted by the class sorting unit 25, codes sub-block mean-value vectors (four dimensions) of the chromaticity block a*. Likewise, numeral 28 denotes a vector quantizer which, based on the class signal 74 outputted by the class sorting unit 25, codes sub-block mean-value vectors (four dimensions) of the chromaticity block b*.

Figures 10, 11A, 11B:
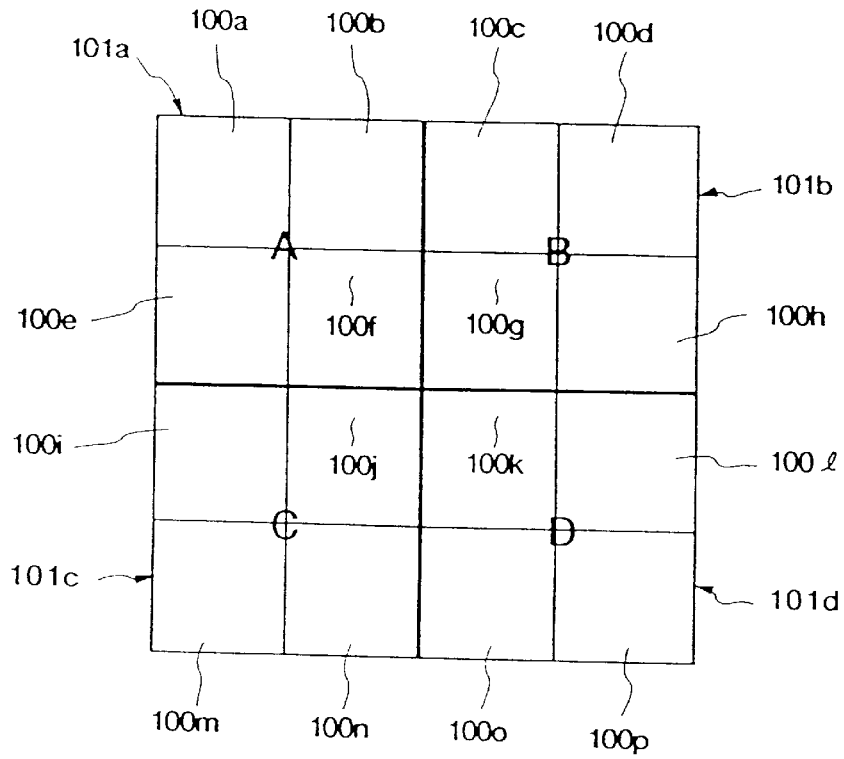
FIG. 10 is a diagram for describing sub-blocks according to the second embodiment.
FIGS. 11A through 11B are diagrams for describing an orthogonal transform according to an embodiment.

FIG. 10 is a diagram for describing sub-blocks in the second embodiment. In FIG. 10, numeral 101a denotes a pixel block of the chromaticity signal a* (and likewise for the chromaticity signal b*). This block comprises pixel signals 100a–100p in a (4×4)-array. The pixel block 101a is divided into (2×2) sub-blocks as illustrated, the respective mean values A–D of which are obtained.

FIGS. 11A and 11B are diagrams for describing an orthogonal transform in the second embodiment. FIG. 11A illustrates a pixel array $x_{mn}$ of a luminosity block, and FIG. 11B illustrates a sequency array $y_{mn}$ of an orthogonally transformed output. Here X, Y both represent 16-dimensional vectors.

$$X = (x_{00} - x_{03}, x_{10} - x_{13}, x_{20} - x_{23}, x_{30} - x_{33} \ldots) \quad (4)$$

$$Y = (y_{00} - y_{03}, y_{10} - y_{13}, y_{20} - y_{23}, y_{30} - y_{33} \ldots) \quad (5)$$

In Y, $y_{00}$ is a DC component, and ($y_{01} - y_{33}$) are AC vectors. The AC components $y_{mn}$ indicate that frequency in the horizontal direction is high if m is large and that frequency in the vertical direction is high if n is large. Accordingly, the general structure of the luminosity block X can be understood from the size of the sequency. For example, in a case where $y_{01}$ is large and the other AC components are small, the luminosity block X is likely to be of the vertical-edge type. The class sorting unit 25 analyzes the characterizing features of the sequency Y and sorts the structure of the luminosity block into the "flat" class, "vertical-edge" class, "horizontal-edge" class or "diagonal-edge" class. By way of example, absolute value LSUM of the low-frequency components, intensity VE of a vertical edge and intensity HE of a horizontal edge are defined as follows as parameters used in judging the structure of the block:

$$LSUM = |y_{00}| + |y_{01}| + |y_{02}| + \\ |y_{10}| + |y_{11}| + |y_{20}| \quad (6)$$

$$VE = |y_{01}| + |y_{02}| + |y_{03}| \quad (7)$$

$$HE = |y_{10}| + |y_{20}| + |y_{30}| \quad (8)$$

FIG. 12 is a flowchart of class sorting processing executed by the class sorting unit 25 of this embodiment. Here $T_1$, $T_2$ represent predetermined threshold values.

It is determined at step S21 whether (LSUM≤$T_1$) holds. If the answer is YES, then the program proceeds to step S24, at which it is decided that the class is the "FLAT CLASS". If the answer at step S21 is NO, then it is determined at step S22 whether (|VE−HE|≤$T_2$) holds. If the answer is YES, then the program proceeds to step S27, at which it is decided that the class is the "DIAGONAL-EDGE CLASS". If the answer at step S22 is NO, then it is determined at step S23 whether (VE<HE) holds. If the answer is YES, then the program proceeds to step S26, at which it is decided that the class is the "HORIZONTAL-EDGE CLASS". If the answer at step S23 is NO, then the program proceeds to step S25, at which it is decided that the class is the "VERTICAL-EDGE CLASS".

FIG. 13 is a block diagram illustrating the vector quantizer 27 (or 28). Mean values A–D from the mean value arithmetic units 23 and 24 enter terminals 70–73. The class signal from the class sorting unit 25 enters the terminal 74. Numerals 75–78, 79–84 denote ROMs which store, in the forms of LUTs, reproduction vector codes predetermined with respect to two-dimensional vectors (A, B), (C, D), respectively. More specifically, the ROMs 75, 79 store reproduction vector codes resulting from vector quantization optimum for the "FLAT CLASS" block, the ROMs 76, 82 store reproduction vector codes resulting from vector quantization optimum for the "VERTICAL CLASS" block, the ROMs 77, 83 store reproduction vector codes resulting from vector quantization optimum for the "HORIZONTAL CLASS" block, and the ROMs 78, 84 store reproduction vector codes resulting from vector quantization optimum for the "DIAGONAL CLASS" block. The results read out of these ROMs are selected by selectors 85, 86 in response to the class signal 74, and the selected data are outputted from terminals 87, 88.

Vector quantization is performed in a similar manner by the vector quantizer 26.

<Code Book Creation Method (1)>

Figure 14:
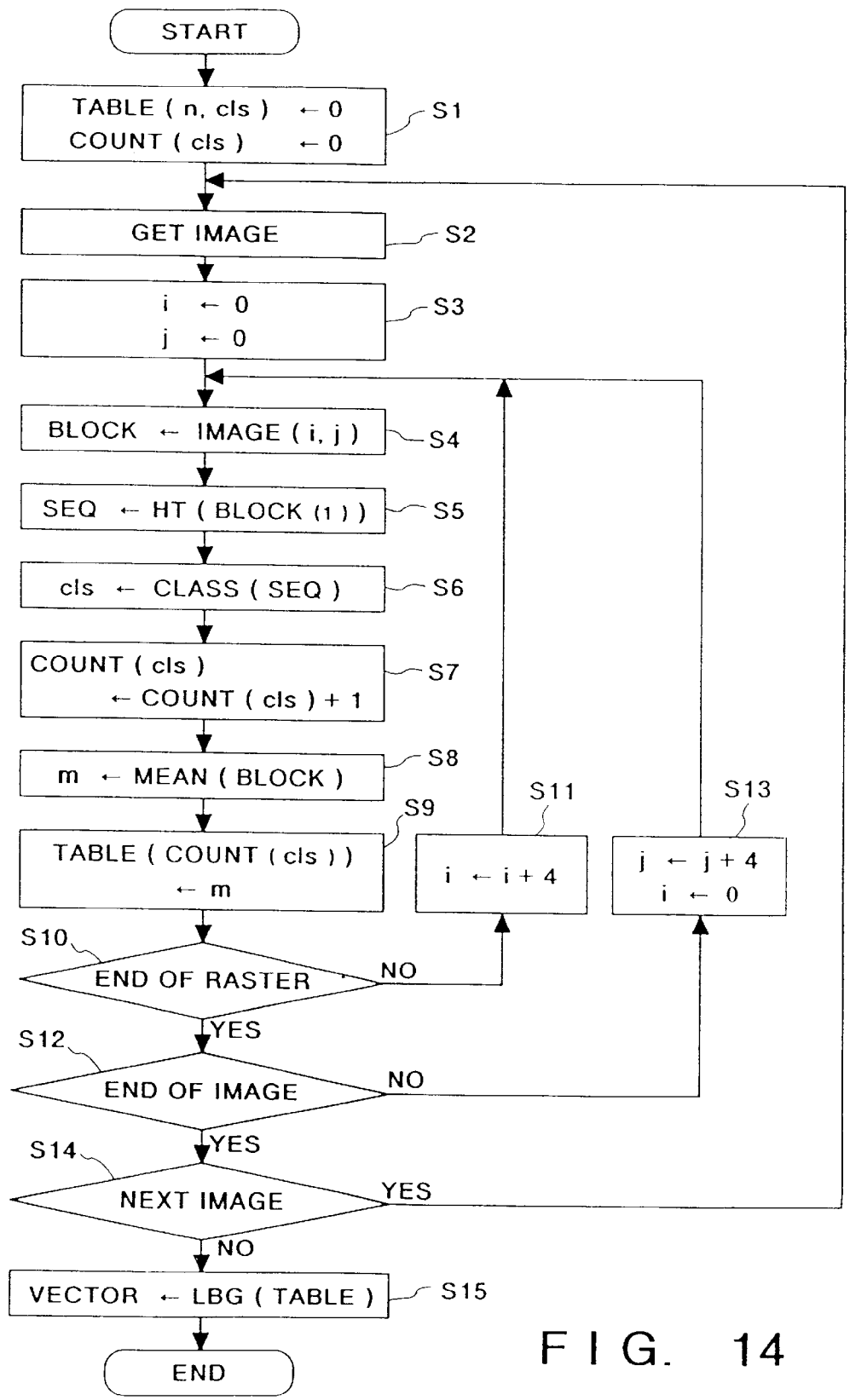
FIG. 14 is a flowchart illustrating a method (1) of creating code books in the second embodiment.
Figure 17:
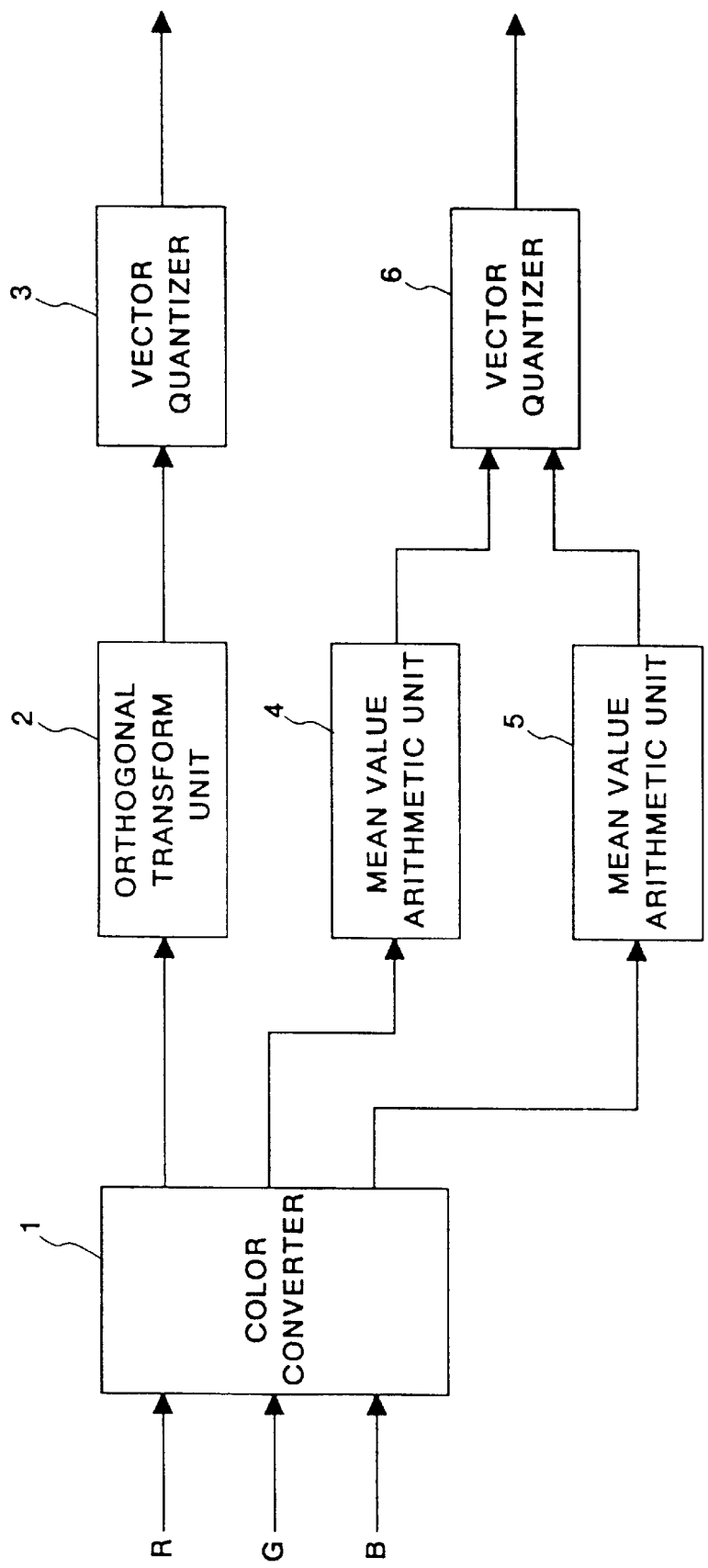
FIG. 17 is a block diagram for describing the conventional coding method.

FIG. 14 is a flowchart illustrating a code book creation method (1) stored in the ROMs 75–78, 79–84 of the second embodiment. According to method (1), a code book is obtained by creating a table using several pages of a training image in which colors are contained uniformly. Specifically, a table [Table (n, cls)] and a counter [Count (cls)] are cleared at step S1. Image data (image) L*, a*, b* are accepted in a work area (not shown) at step S2. An address (i,j) of the work area is cleared at a step S3. Step S4 calls for cut-out of an image block [block (k):k=i,j] composed of (4×4) pixels, in which the address (i,j) of the image is the upper-left pixel. A Hadamard transform (HD) is applied to the block [block (1)] of the luminosity signal L* at step S5 to obtain the resulting sequency (seq). The sequency (seq) is classified [CLASS (seq)] in accordance with the flowchart of FIG. 12 at step S6 to obtain the resulting class signal (cls).

Next, the counter [count (cls)] of the class corresponding to the class signal (cls) obtained is incremented at step S7. Sub-block division shown in FIG. 10 is applied with respect to the blocks [block (2), (3)] of the respective chromaticity signals a*, b*, the mean value [MEAN (block)] of each sub-block is found, and the resulting mean-value vector (m) is obtained at step S8. The mean-value vector (m) obtained is newly registered in the table {Table [count (cls)]} at step S9. It is determined at step S10 whether this is the end block (End of Raster) of the block data. If it is not the end block, the program proceeds to step S11, where the address (i) incremented by +4, after which the program returns to step S4. That is, the program proceeds to the next step.

If the block is found to be the end block at step S10, then the program proceeds to step S12 to determine whether this is the end block (End of Image) of the image data (image). If this is not the end block of the image data, the program proceeds to step S13, at which the address (j) is incremented by +4 and the address (i) is made 0, after which the program proceeds to step S14. That is, the program proceeds to the next step. If the block is found to be the end block of the image data at step S12, the program proceeds to step S14, at which it is determined whether to read in the next item of image data (next image). If the next item of image data is to be read in, the program proceeds to step S2; if this image data is not to be read in, the program proceeds to step S15. Here a reproduction vector (Vector) is obtained by the well-known LBG method from the acquired table (table) of each class, and processing is terminated.

Since the class signal (cls) is thus considered when creating the code book, reproduction vectors suited to the statistical properties of the image can be obtained and color edge reproduction can be improved.

<Code Book Creation Method (2)>

According to method (2), a model is set based on the mean values W, Z of two sub-blocks (e.g., mean values A and B or C and D of FIG. 10), a table is created, and a code book is obtained from the table.

In general, when a comparatively large edge is present in the luminosity block, i.e., in a case where the class is other than the "flat class", it is considered that the mean values of the chromaticity block a* and/or b* have a comparatively large difference. For example, in the case of the "vertical-edge class", it is considered that there are many vectors of comparatively large difference in chromaticity a* or b*. In the case of the flat class, it is considered that the difference is small.

FIG. 15 is a view showing a chromaticity (a*, b*) plane. In FIG. 15, suitable sampling points are provided on the grid of an (a*, b*) plane, and these sampling points serve as representative colors. A method of creating a table based on these representative colors will described.

It will be assumed that a block is represented by two different points on the chromaticity plane, and that there are two different colors present in a block. The reason is that in a local portion referred to as the (4×4) pixel block, a large amount of degradation will not occur, even with two colors. Here two points W, Z on the grid of the (a*, b*) plane are taken as sampling points and serve as representative colors. Since the grid points W, Z each are points on the (a*,b*) plane, each is considered to be a two-dimensional vector. Accordingly, two colors in a block are expressed by a combination of these grid points W, Z. A four-dimensional vector representing this combination shall be Φ=(W, Z).

First, there will be described a method of creating a table (F) in the case of the "flat class" in which there are no edges, namely in a case where the values of the representative colors (W, Z) in the vector Φ are very near. Letting any point of the grid be the representative color W, a representative color Z will be considered to possess a value very near the representative color W. Accordingly, letting l represent the length of one side of the grid, a grid point within a circle of radius 3 l is capable of being the representative color Z with respect to the representative color W, by way of example. The sampling density in the actually expressible (a*, b*) space, and which depends upon the length l of the one side of the grid, is decided. Accordingly, it is possible for the scale of the table to be manipulated by changing l.

Further, the (a*, b*) plane delimited by the radius 3 l is a uniform color space. Therefore, the center and each point within the radius of 3 l are points which visually do not differ markedly in color. The situation is shown in FIG. 16. The center point of the representative color W and the 28 grid points indicated by the white circles contained in the circle of radius 3 l are the values of the representative color Z. Twenty-nine four-dimensional vectors Φ are obtained by these values. Thus, these four-dimensional vectors are created with regard to all grid points, and a table (F) is created by deleting redundantly occurring vectors. A code book of the flat class is thus created.

Described next is a method of creating a table (E) in a case where image data contain an edge, namely a case in which there is a comparatively large difference in chromaticity. In what is the converse of the case described above, all grid points (unmarked grid points) outside the circle of radius 3 l whose center is the representative color W in FIG. 16 are values of the representative color Z. The four-dimensional vectors Φ are obtained thereby. Thus, four-dimensional vectors are obtained with all grid points serving as the representative color W, and a table E is created by deleting redundantly occurring vectors.

In a case where the embodiment is applied to an actual image, the representative colors W, Z comprise the mean values A–D in the sub-blocks of FIG. 10, and there are a total of 16 combinations thereof. Furthermore, since vector quantization is performed independently with regard to a*, b*, each vector Φ of the table (F) is applied to the mean values A–D and eight-dimensional vectors Q are created. These are separated with regard to the a*, b* information, four-dimensional vectors R comprising solely the a* information and four-dimensional vectors S comprising solely the b* information are obtained, these are separated into individual vectors and these are adopted as tables (G), (H).

Similarly, with regard to table (E), a table (I) comprising four-dimensional vectors T which comprise solely the a* information and a table (J) comprising four-dimensional vectors U which comprise solely the b* information are obtained. Code books are created from these tables. The a* information will be considered first.

The LBG method is applied to the tables (G), (I) to obtain the reproduction vector codes. Let N represent the number of bits outputted from each code book. Some of these bits, namely n bits (N>n), obtain reproduction vectors from the table (G), the remaining (N-n) bits obtain reproduction vectors from the table (I), and these are combined to obtain a code book comprising N bits of reproduction vectors. Processing is similar with regard to the b* information. That is, in the case of the "flat class", the proportion of n is large with respect to N. Conversely, in the case of the "edge class", the proportion of n is small with respect to N. By thus changing and applying the bit allotment, class sorting inaccuracy is compensated for and improved reproduction executed.

By thus taking a model into consideration, even vectors which were not included in the training image can be reproduced. Moreover, highly efficient coding becomes possible even with regard to artificial images created by computer.

It should be noted that color conversion is not limited to the signals L*, a* and b* of the foregoing embodiment. The conversion can be applied to any signals, such as Y, I, Q signals and Y, Cr, Cb signals, as long as they represent brightness and color.

In addition, extraction of the structural signals is not limited to the Hadamard transform. Other methods can be employed, such as the discrete cosine method and a method of detecting representative colors and discrete maximum and minimum values. Further, in extraction of the structural signals, it is permissible for representative colors of luminosity to be adopted as the structural signals. Furthermore, block size, the number of classes, the number of vector quantizers and the dimensions of the vectors are to limited to those in the foregoing embodiments.

Third through fifth embodiments will now be described in which the present invention is applied to coding of an image signal.

[Third Embodiment]

Figure 18:
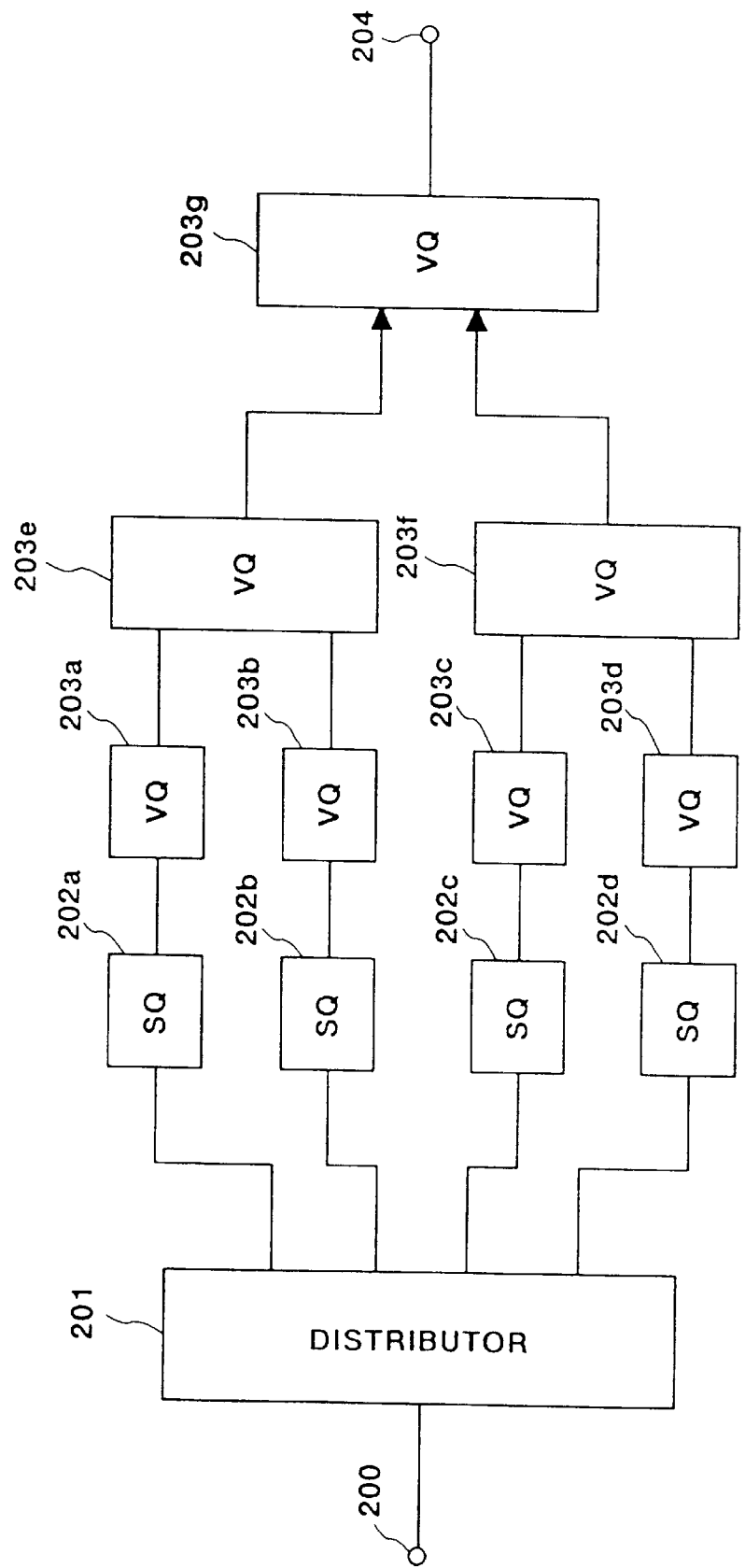
FIG. 18 is an overall block diagram of a coding apparatus according to a third embodiment of the present invention.

FIG. 18 is a block diagram illustrating a coding apparatus according to the third embodiment. Numeral 200 denotes an input terminal for inputting an image signal to the apparatus in vector form. This vector serving as the image data is obtained by applying the Hadamard transform to a 4×4 image block. Numeral 201 denotes a distributor for finely dividing the inputted vector into partial spaces. Numerals 202a–202d denote scalar quantizers (abbreviated to "SQ" in the Figure) for subjecting inputted sequencies to scalar quantization sequency by sequency. Numerals 203a–203g represent vector quantizers, among which the vector quantizers 203a–203d are LUT memories storing the codes of vectors at the shortest distances from the inputted vector. The vector quantizers 203e–203g are constituted by LUT memories storing the codes of vectors at the shortest distances from vectors represented by inputted vector codes. More specifically, the four vector quantizers of 203a–203d are arranged in parallel, and the two quantizers 203e, 203f (which are disposed parallel to each other) and quantizer 203g are arranged in series with respect to the four quantizers 203a–203d. Numeral 204 designates an output terminal of a code serving as the outputted results of vector quantization.

Coding of an image in this embodiment entails cutting out 4×4 blocks, applying preprocessing (one example of which is the Hadamard transformation in this embodiment) in block units, and vector-quantizing the results, thereby deciding a mapping vector in vector quantization at the time of image coding.

FIG. 20A is a view showing 4×4 vector space division applied to the distributor 11 of the third embodiment. As described above, a sequency 20a is a DC component and is excluded from vector quantization. The 15 AC-component sequencies 20b–20p enter from the terminal 200 of the coding apparatus of this embodiment. The distributor 201 acts to distribute the sequencies 20b–20p in the manner shown in FIG. 20A to the scalar quantizers connected to its output side. That is, the distributor 201 divides the input vector space into partial spaces. More specifically, the sequencies 20b, 20e, 20f are distributed to the scalar quantizer 202a, the sequencies 20c, 20g, 20i, 20j to the scalar quantizer 202b, the sequencies 20d, 20h, 20m, 20n to the scalar quantizer 202c, and the the sequencies 20k, 20l, 20o, 20p to the scalar quantizer 202d. The scalar quantizers scalar-quantize each sequency up to the number of bits that enables the vector quantizers 203a–203d to be constituted by the minimum number of ROMs. It is possible for the scalar quantizers 202a–202d to be constituted by a number of ROMs equal to the number of sequencies or by a few number of ROMs through use of latches.

The scalar quantizer 202a outputs a three-dimensional vector following scalar quantization by the sequencies 20b, 20e, 20f, the scalar quantizer 202b outputs a four-dimensional vector following scalar quantization by the sequencies 20c, 20g, 20i, 20j, the scalar quantizer 202c outputs a four-dimensional vector following scalar quantization by the sequencies 20d, 20h, 20m, 20n, and the scalar quantizer 202d outputs a four-dimensional vector following scalar quantization by the sequencies 20k, 20l, 20o, 20p.

The vector quantizers 203a–203d perform quantization with respect to three- or four-dimensional vectors applied thereto by the scalar quantizers, thereby obtaining the codes of reproduction vectors that are outputted to the vector quantizers 203e, 203f. That is, the vector quantizer 203e receives as inputs the codes of the reproduction vectors of the preceding vector quantizers 203a, 203b, and the vector quantizer 203f receives as inputs the codes of the reproduction vectors of the preceding vector quantizers 203c, 203d.

The contents of the LUTs constituting the vector quantizers 203e, 203f will now be described with regard to the decision technique. First, the code of an inputted reproduction vector is decoded into a vector, then the entire space of this vector is divided in half, as shown in FIG. 20B, to create new vectors. The codes of reproduction vectors obtained by applying vector quantization to these new vectors are found and these become the contents of the LUTs 203e, 203f.

Thus, the vector quantizer 203e performs vector quantization with regard to the original sequencies 20b, 20c, 20e, 20f, 20g, 20i, 20j, and the vector quantizer 203f performs vector quantization with regard to the original sequencies 20d, 20h, 20k, 20l, 20m, 20n, 20o, 20p.

The inputs to the vector quantizer 203g are the reproduction vector codes from the preceding vector quantizers 203e, 203f. Specifically, just as in the case of the preceding vector quantizers 203e, 203f, the inputted reproduction vector codes are decoded, the vector space is returned to 15 dimensions and the reproduction vector codes which are the results of vector quantization are obtained.

By adopting this arrangement, reproduction vector codes are obtained via multistage vector quantizers to which the 15-dimensional input is applied.

Creation of the code book of each vector quantization will now be described. In general, code book creation is performed using the LBG method. This is well known as a technique for calculating reproduction vectors from training data serving as a population. Accordingly, the LBG method is used in the present embodiment. The 4×4 vector space mentioned above will be described as an example.

A method of collecting vectors obtained by actually applying the Hadamard transform to an image is available as a method of creating training data. Thus, training data comprising a 16-dimension vector is created. Sequencies necessary for each of the vector quantizers are extracted from the training data by the Hadamard transform, and training tables comprising the vectors of the necessary dimensions are created. The LBG method is applied in order to obtain the necessary reproduction vector codes from these tables. The reason for this is that by directly designing each vector quantizer from the training data, code books can be obtained that are free from distortion caused by the quantization of the preceding stage.

With this method of code book creation, code books are obtained that are ideal for all stages in that they are free of distortion. However, cases occur in which reproduction vectors are not used in the succeeding stage owing to quantization in the preceding stage. Accordingly, a problem arises in that efficiency is poor.

Figure 21:
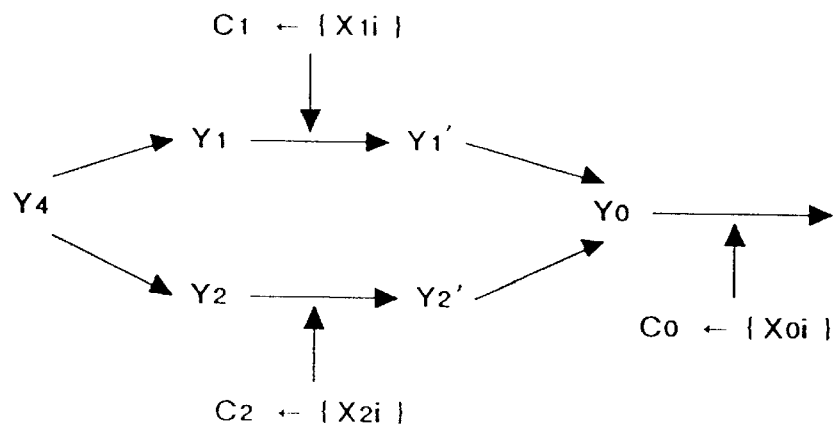
FIG. 21 and FIGS. 22A through 22D are diagrams for describing the manner in which reproduction vectors not used are generated.
Figure 22A:
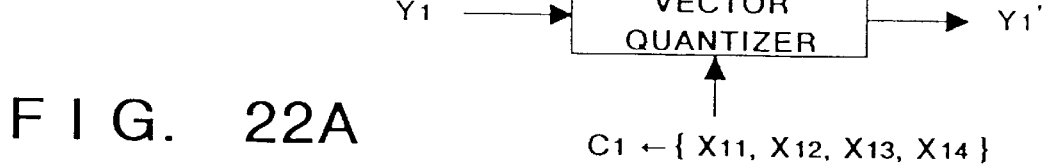

FIGS. 21 and 22 are diagrams for describing the generation of reproduction vectors that are not used. FIG. 21 is a diagram for an overall description of the generation of reproduction vectors with regard to a 2×2 block. FIGS. 22A–22D are for describing the individual steps of FIG. 21. The reason for adopting 2×2=4 as the vector size is that the description is simplified over the case where 4×4=16 is the vector size. There is no substantial difference between the two. Accordingly, the discussion relating to the 2×2 configuration in FIGS. 21–22 is applicable to a discussion of the 4×4 configuration. The processing of FIG. 21 is illustrated below. A four-dimensional vector $$Y_4 = \{y_1, y_2, y_3, y_4\}$$

is entered and the vector $Y_4$ is divided into the following, as shown in FIG. 22A:

$$Y_1 = \{y_1, y_2\}$$

$$Y_2 = \{y_3, y_4\}$$

This division corresponds to the division made by the distributor 201 in FIG. 18. Further, in to FIG. 21, vector quantization is performed with respect to the individual divided vectors $Y_1$, $Y_2$, and a vector $Y_0$ obtained by combining these results is vector-quantized again. This is the processing of FIG. 21. Here $y_1$–$y_4$ are assumed to be items of two-bit data the values of which are 0, 1, 2 or 3.

Reproduction vectors $X_{11}$–$X_{14}$ of a code book $C_1$ for vector-quantizing $Y_1 = \{y_1, y_2\}$ to two-bit information are determined as follows, as illustrated in FIG. 22A:

$$C_1 \in \{X_{1i}\} \ (i=1-4)$$

$$X_{11} = \{0, 0\}, X_{12} = \{1, 3\}$$

$$X_{13} = \{3, 1\}, X_{14} = \{3, 3\}$$

Figure 22B:
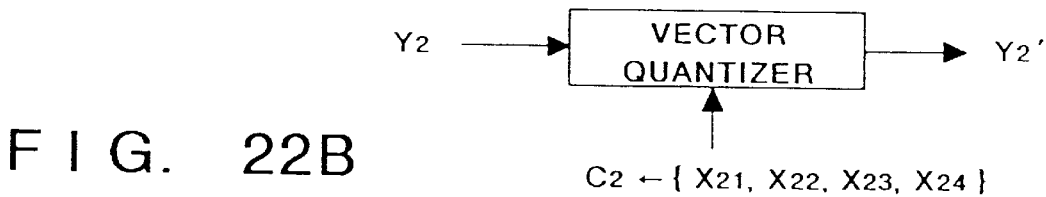
Figure 22C:
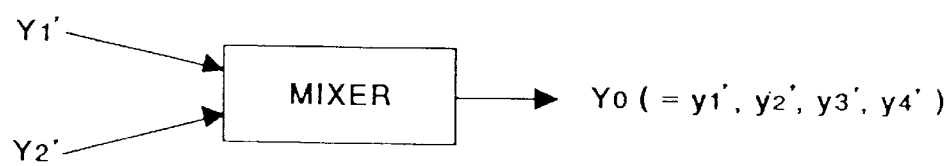
Figure 22D:
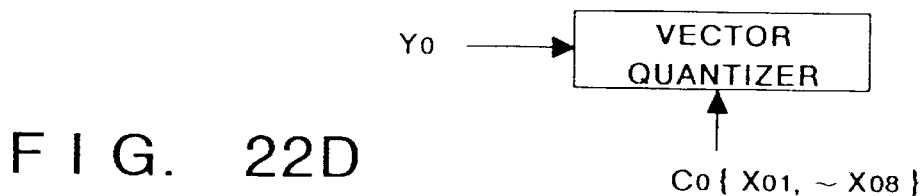

Further, $Y_2 = (y_3, y_4)$ is vector-quantized, and reproduction vectors $X_{21}$–$X_{24}$ of a code book $C_2$ for vector-quantizing $Y_2$ to two-bit information are determined as follows, as illustrated in FIG. 22B:

$$C_2 \in \{X_{2i}\} \ (i=1-4)$$

$$X_{21} = \{0, 0\}, X_{22} = \{0, 1\}$$

$$X_{23} = \{1, 0\}, X_{24} = \{2, 2\}$$

Furthermore, reproduction vectors obtained as a result of vector-quantizing $Y_1$, $Y_2$ are taken to be as follows:

$$Y_1' = \{y_{1'}, y_{2'}\}$$

$$Y_2' = \{y_{3'}, y_{4'}\}$$

and a vector which results from combining these is as follows:

$$Y_0 = \{y_{1'}, y_{2'}, y_{3'}, y_{4'}\}$$

Reproduction vectors of a code book $C_0$ for vector-quantizing the foregoing are determined as follows:

$$C_0 \in \{X_{0i}\} \ (i=1-8)$$

$$X_{01} = \{0, 0, 0, 0\},$$

$$X_{02} = \{0, 0, 1, 0\},$$

$$X_{03} = \{1, 1, 2, 1\},$$

$$X_{04} = \{1, 3, 2, 1\},$$

$$X_{05} = \{2, 1, 0, 0\},$$

$$X_{06} = \{2, 1, 0, 1\},$$

$$X_{07} = \{3, 1, 0, 0\},$$

$$X_{08} = \{3, 2, 1, 1\},$$

Vectors and code books are thus defined. Generation of reproduction vectors that are not used will now be described.

For example, a case will be considered in which a vector having a component such as $Y_i = \{2,1\}$ is inputted. $Y_1$ is quantized to $Y'_1 = X13 = \{3,1\}$ by vector quantization of the code book $C_1$. This $Y_1'$ is combined with $Y_2'$ to obtain the resultant vector $Y_0$, and vector quantization is performed by the code book $C_0$. Accordingly, $\{2,1\}$ is quantized to $(3,1)$, which has the shortest distance, by vector quantization of $C_1$. Therefore, when the vector $Y_0$ is quantized, only the input vector having the $\{3,1\}$ component of the code book $C_0$ is quantized to $Y_0$. In other words, the $\{2,1\}$ component does not appear in the vector $Y_0$, and therefore the reproduction vectors $X_{05}$, $X_{06}$ having the $\{2,1\}$ in $C_0$ are not used at all. These vectors that are not used shall be referred to as "unused reproduction vectors". When vectors thus unused are stored in a code book, efficiency declines. Accordingly, efficiency is raised by excluding the unused reproduction vector $X_{05}$ and adding a new reproduction vector in its place.

Figure 23:
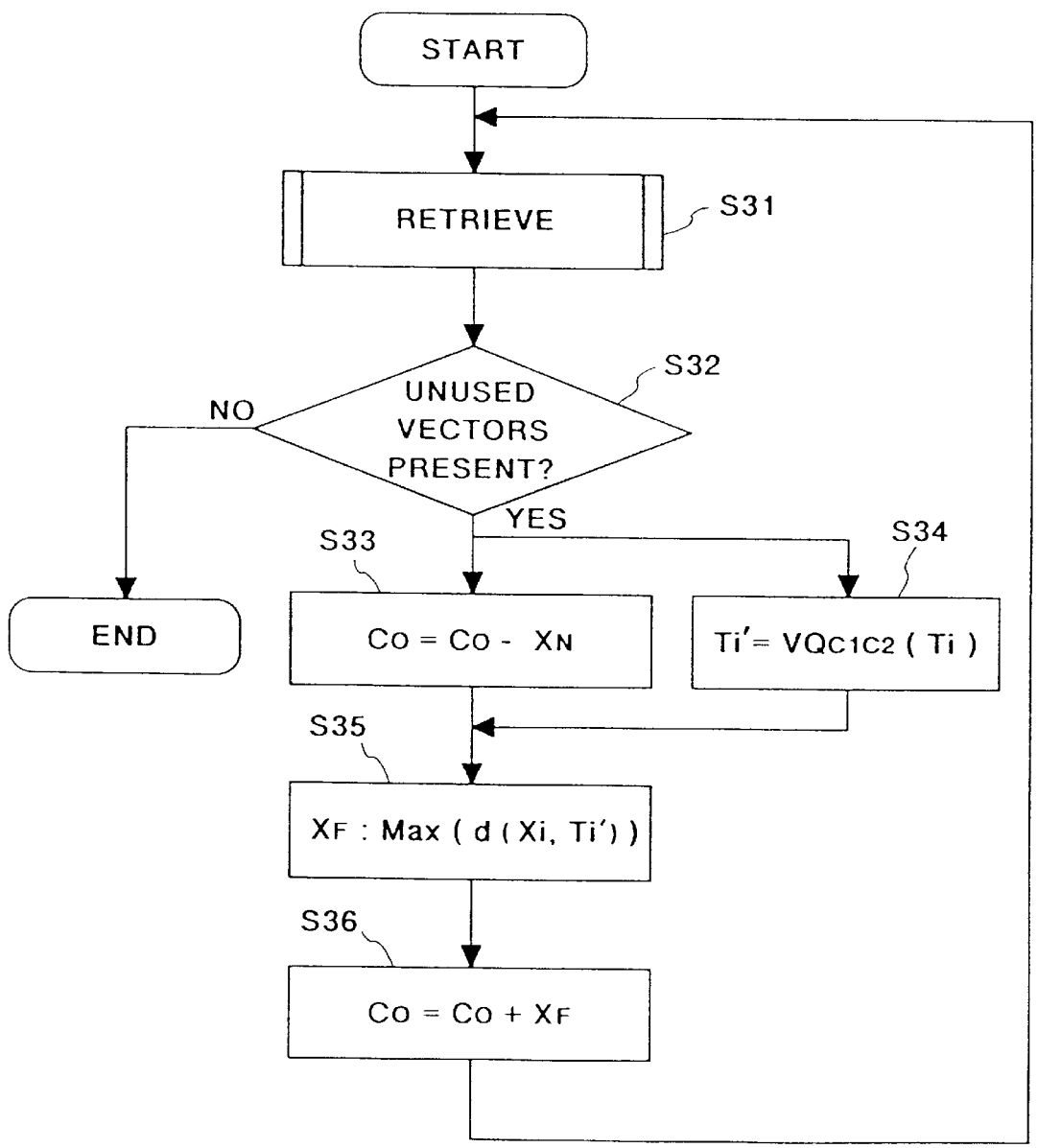
FIG. 23 is a flowchart illustrating a procedure for replacing unused vectors from training data.

FIG. 23 illustrates a flowchart of a procedure for excluding unused reproduction vectors and replacing them with new reproduction vectors. The flowchart is a procedure which, by way of example, is for excluding unused vectors in the code book $C_0$ in a case, as shown in FIG. 21, where a 2×2 input vector is divided into two vectors respectively vector-quantized by $C_1$, $C_2$, the results are combined into a 2×2 vector, and this vector is vector-quantized again by the code book $C_0$.

First, at steps S31, S32, a check is performed to determine whether there are unused reproduction vectors in the code book $C_2$. This check is performed as follows: Vector quantization of $C_1$ or $C_2$ is carried out with respect to all patterns of input vectors, and the resulting reproduction vectors are vector-quantized by $C_0$. Vectors in $C_0$ not used even once as reproduction vectors with regard to all input patterns are discarded as unused reproduction vectors $X_N$. It should be noted that the pattern of input vectors refers to any pattern of "000"–"1111" in the example of FIG. 21.

Next, at step S33, the unused vectors $X_N$ are excluded from the code book $C_2$. At the same time, vector quantization is performed by C1, C2 with regard to all training data T to obtain new training data T'. Accordingly, the operation through which a 2×2 vector $T_i$ is divided into two vectors and vector quantization of $C_1$, $C_2$ is applied to each of these to obtain a new vector T' is written as follows:

$$T_i' = VQ_{C1C2}(T_i)$$

Accordingly, we have $T_i \in$ code book T $T_i \in$ code book T

The dimensions of the training data at this time are the dimensions of the vector space represented by the code book $C_0$. Next, from among the vectors $T_i'$ of the new training data T', those having the greatest distances from the reproduction vectors $X_i$ in the code book $C_0$ are obtained as vectors $X_F$. That is, the following operation is performed:

$$X_F = \mathrm{MAX}(\mathrm{dis}\{X_i, T_j'\})$$

At step S36, vectors $X_F$ having the greatest distance are added to the code book C0 as new reproduction vectors. That is, the following operation is performed:

$$C_0 \leftarrow C_0 + X_F$$

In this case, XF is stored in the portion of $C_0$, which is a LUT, from which the aforementioned $X_N$ was excluded. Since unused production vectors are generated at portions of high density, new reproduction vectors are added to areas of low density by the foregoing operation. This is to achieve reconciliation between greater uniformity of density and higher efficiency in the code book $C_0$ serving as a table.

The foregoing operation is repeated until unused vectors are no longer contained in the code book $C_0$.

[Fourth Embodiment]

Figure 24:
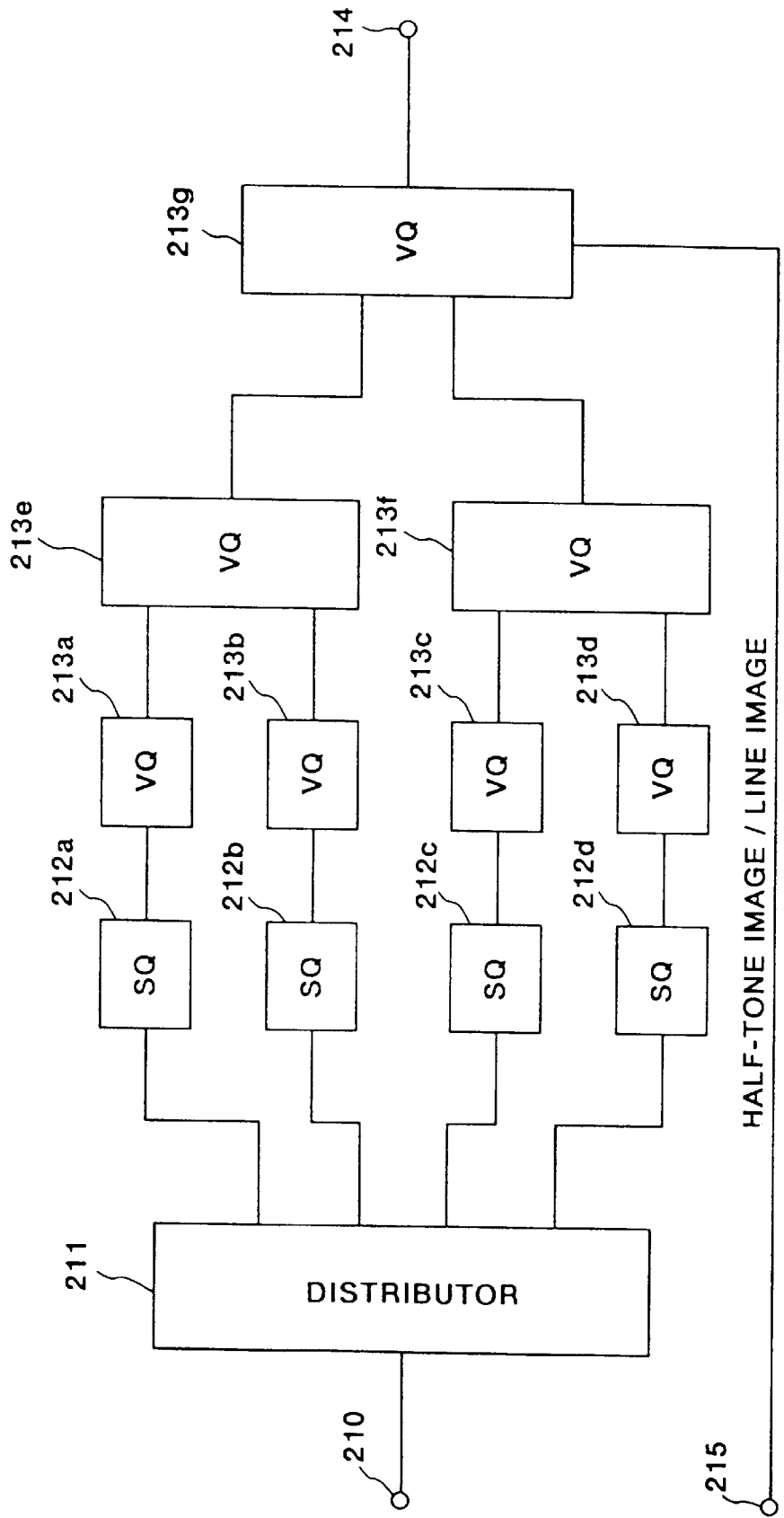
FIG. 24 is a block diagram of a coding apparatus according to the fourth embodiment of the invention.

FIG. 24 is a block diagram showing a fourth embodiment of the present invention. This embodiment is identical with the foregoing embodiment in that vector quantization is achieved by a multistage arrangement. However, whereas the third embodiment excludes unused reproduction vectors, extracts new reproduction vectors from training data and adds these new reproduction vectors, the fourth embodiment is so adapted that when an input image contains a mixture of line images and half tones, unused reproduction vectors are excluded and reproduction vectors suited to vector quantization of the line image are added.

In order to simplify the description, 4×4 sequencies obtained by the Hadamard transform will be taken as an example, just as in the third embodiment. In FIG. 24, numeral 210 denotes an input terminal for inputting 15 sequencies. As in the third embodiment, the DC component is excluded from quantization. Numeral 211 denotes a distributor for finely dividing inputted vectors. Numerals 212a–212d denote scalar quantizers for subjecting inputted sequencies to scalar quantization. Numerals 213a–213g represent quantizers for vector-quantizing inputted vectors or vectors represented by vector codes. These vector quantizers are LUT memories storing the codes of vectors at the shortest distances from the inputted-vectors. Numeral 214 designates an output terminal. A terminal 215 is an input terminal to which is applied a select signal for selecting whether the image of a sequency inputted from the terminal 210 is a line image or a half tone.

The 15 sequencies enter from the input terminal 210 and are distributed by the distributor 211 to those scalar quantizers connected to its output side. The distribution method is the same as in the third embodiment. The vector quantizers 213a–213f connected to the output sides of the scalar quantizers 212a–212d operate in the same manner as in the third embodiment. The select signal enters from the input terminal 215 and changes over the code book in the vector quantizer 213g of the last stage. For the sake of the description, the code book of vector quantizer 213g is changed over between a case where the inputted image is a natural image (half-tone image) such as a photograph and a case where the inputted image is a character or fine line image. In the code book changeover, a complete changeover is not made between two code books. Rather, two small, special code books for line images and natural images are prepared and either of these is selected for use by the select signal. Such an arrangement is effective for performing preservation of edge information, though such information occurring in a character image is small.

The reason for performing this operation is as follows: When the sequencies of a Hadamard transform are quantized, the quantization generally is executed coursely with regard to high-frequency sequencies. In a case where the training data is a natural image, sharp edges are not reproduced if the code book obtained using these training sequencies is used. That is, when slanted-line data having a large density difference of 45° of the kind shown in FIG. 25A are inputted, the edge portion is indicated by the blocks 121a–121k delimited by the bold lines in the Figure. The shape of the distribution in each block is as shown in FIG. 25(a) or (b). FIG. 26A is a diagram of an example in which vector quantization is applied after these shapes are subjected to the Hadamard transform. The abovementioned block (a) or (b) in FIG. 25B becomes smooth and assumes the block shape (a') or (b') of the kind shown in FIG. 26B. Accordingly, the black of the one pixel in block (a) becomes extremely faint since it is surrounded by a great deal of white, and the block becomes close to a white flat block as shown at (a') in FIG. 26B. In the case of block (b), the two pixels near the black edge are surrounded by a great deal of black and therefore become very close to black. As a result, the remaining pixel in the lower right corner also takes on the color black, as shown at (b') in FIG. 26B. Consequently, the texture of the 4×4 block becomes prominent at the diagonal edge in FIG. 26A, and this has an adverse effect upon image quality. A low-frequency edge is preserved also in the case of a natural image.

Accordingly, the constitution of code book A of vector quantizer 213g is made as shown in FIG. 27.

The code book A comprises a code book B composed of (n-α)-number of reproduction vectors from among the n-number of reproduction vectors, a code book N for a natural image composed of α-number of reproduction vectors, and a code book C for character images composed of α-number of reproduction vectors. Here α can be considered to correspond to the number of unused vectors of the kind which appear in the third embodiment. Specifically, the code book B is one from which unused vectors have been deleted. The code book N is constituted by reproduction vectors created from training data, as illustrated in the third embodiment. The code book C is one in which blocks (a), (b) of the kind shown, for example, in FIG. 25B, are registered in advance as reproduction vectors.

Figure 28:
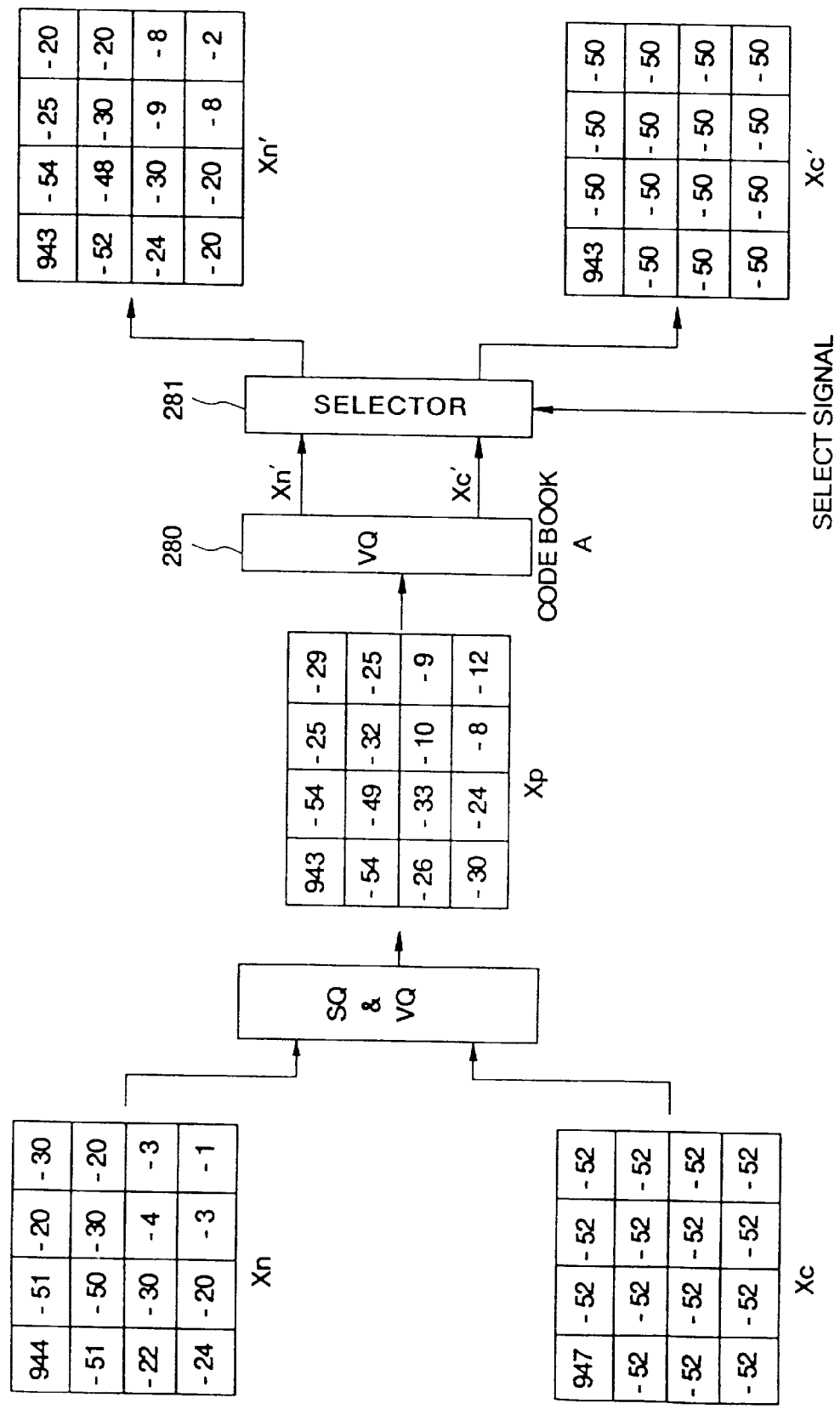
FIG. 28 is a diagram for describing the operation of the fourth embodiment of the invention using an actual example.
Figure 30A:
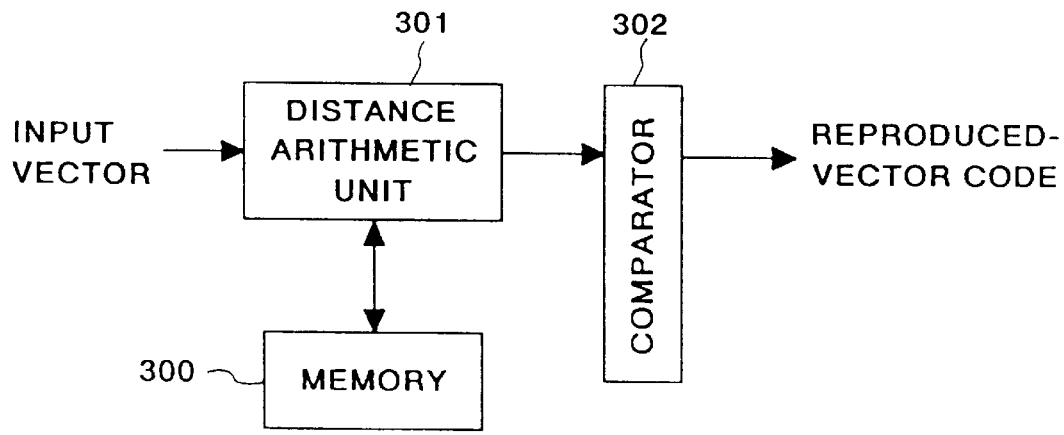
FIGS. 30A, 30B are diagrams for describing the construction of prior art.
Figure 30B:
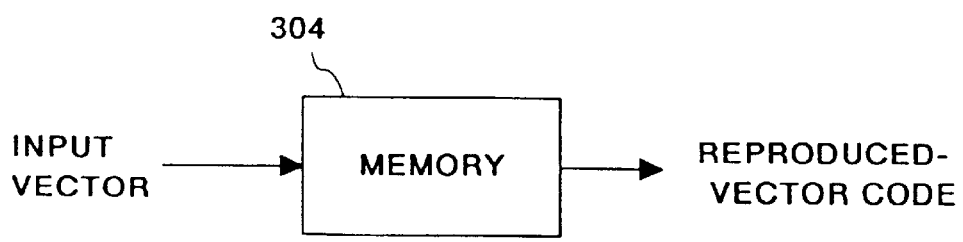

An example of actual quantization is illustrated in FIG. 28.

In FIG. 28, an input vector $X_n$ is a vector of a natural image. An input vector $X_c$ is the edge portion of a character image and is inputted upon Hadamard-transforming a block of the kind (a) shown in FIG. 25B. Though these vectors are not inputted simultaneously, whenever one is inputted it is distributed by the distributor 211 and quantized via the scalar quantizers 212a–121d and vector quantizers 213a–213f of FIG. 24. The result of this quantization is $X_p$ shown in FIG. 28. A vector quantizer 280 on the right side of FIG. 28 represents vector quantization executed by the vector quantizer 213g of FIG. 24. This vector quantization entails calculating a reproduction vector Xn' calculated by a distance computation from the code book N, and a reproduction vector Xc' calculated by a distance computation from the code book C.

A select signal which enters from the input terminal 215 of FIG. 24 is applied to a selector 281 in FIG. 28. In a case where the object of coding processing is designated to be a natural image by the select signal (namely a case where the input is the vector $X_N$ in FIG. 28), the selector 281 selects the code of the reproduction vector $X_n'$. On the other hand, in a case where the select signal indicates the character image (namely a case where the input is the vector Xc in FIG. 28), the selector 281 selects the code of the reproduction vector Xc'. This makes it possible to maintain the sharpness of an edge.

The fourth embodiment of the invention is such that when there is an input of an image, such as a natural image, in which a half-tone image and a line image or the like are mixed, coding can be carried out with good reproducibility without degrading the quality of the original image. In addition, overall code book capacity can be reduced by making common use of those portions of the half-tone image and line image capable of sharing code books.

[Fifth Embodiment]

In a fifth embodiment, code book form is made as shown in FIG. 29 in the vector quantizer 213g of the fourth embodiment illustrated in FIG. 24. In FIG. 29, the code book C is one corresponding to an edge such as the character information, as mentioned earlier. That is, this code book includes patterns of reproduction vectors of the kind shown in FIG. 26B. This can also be obtained by generated binary patterns in a computer. These production vectors for an edge are added, as the code book C, to a portion from which unused vector have been deleted in the code book B of the final-stage quantizer.

The reproduction vectors in the code book C of the fifth embodiment are obtained not by a simple distance computation but by computing distance upon taking into consideration "+" and "−" phase information as well as the absolute values of each of the coefficients. More specifically, in a case where the sign of each sequency of the vector $X_P$ resulting from quantization in FIG. 28 is "−" and the absolute value of each sequency resulting from this quantization is maximum at the absolute value resulting from each scalar quantization, it is judged that the original block has a shape similar to that of the block (a) in FIG. 25B, and the code of the reproduction vector $X_c'$ of FIG. 28 is outputted.

When this arrangement is adopted, the selector 281 of FIG. 28 is unnecessary and so is the selector signal 215.

<Advantages of the Invention>

As described above in the third through fifth embodiments, vector quantization is implemented in multistages and reproduction vectors, which are obtained from training data (third embodiment) or artificial data (fourth embodiment), are formed upon excluding inefficient unused vectors. These vectors are formed in addition to the optimum reproduction vectors obtained by applying the LBG method to each code book. As a result, the dimensions of vector space and the number of input vectors which appear can be reduced, and vector quantization capable of being implemented by hardware can be realized. At the same time, with regard to formation of the LUTs, processing time can be shortened greatly in a case where computer processing is executed with a reduced number of dimensions. Furthermore, performance equivalent to that of a complete look-up-type vector quantizer can be obtained even with multidimensional vectors.

The present invention can be modified in various ways within a scope that does not change the gist of the invention.

In the description of the foregoing embodiments, sequencies of a 4×4 Hadamard transform or four-dimensional vectors are used. However, it is obvious that the invention is not limited to such an arrangement but is applicable to all n (n≧3)-dimensional vectors.

Further, though the select signal for selecting the type of image is inputted only to the vector quantizer of the last stage in the fifth embodiment, a modification is permissible in which the select signal is inputted to other vector quantizers, scalar quantizers and the distributor, as in the foregoing embodiments.

The method of adding new reproduction vectors to a code book after unused vectors are deleted is not limited to that described. It is possible to add and vectors, taken from the training data, that are farthest from the reproduction vectors, or to add vectors extracted from the training data. Furthermore, though reproduction vectors added to a code book are made binary patterns created by computer, this does not limit the invention, for three-valued patterns may be used. In particular, patterns may be entered manually in a case where the number is small.

In accordance with the present invention as described above, the dimensions of the vector space can be reduced by implementing vector quantization in multiple stages. More specifically, there can be provided a coding method and apparatus capable of reducing the dimensions of vector space, and an efficient code book applicable to this method and apparatus can be created.

Further, by deleting inefficient unused vectors which appear in results obtained in the multistage arrangement, the vector quantizer arrangement can be reduced in scale.

In addition, the deleted vectors are made up for by reproduction vectors obtained from training data or artificial data. As a result, a performance equivalent to that of a complete look-up-type, high-speed vector quantizer can be obtained, even for multidimensional vectors, while preventing degradation of the reproduction signals.

As many apparently widely different embodiments of the present invention can be made without departing from the spirit and scope of thereof, it is to be understood that the invention is not limited to the specific embodiment thereof except as defined in the appended claims.

What is claimed is:

1. A coding apparatus for coding input image data of every block of a predetermined size, comprising:

first vector quantizing means for vector-quantizing the input data and outputting L-bit vector quantized data;

second vector quantizing means for performing further vector quantization on m items of L-bit vector quantized data output from said first vector quantizing means, without expanding said m items of L-bit vector quantized data, and outputting n-bit vector quantized data (where n<L×m);

selecting means for exclusively selecting either the m items of L-bit vector quantized data or the n-bit vector quantized data based on a selection signal; and output means for outputting the m items of L-bit vector quantized data or the n-bit vector quantized data selected by said selecting means as a vector quantization result of the input image.

2. The apparatus according to claim 1, further comprising extracting means for extracting frequency components from every block, said frequency components being inputting to said first quantizing means.

3. The apparatus according to claim 2, further comprising dividing means for dividing said block into a plurality of sub-blocks in dependence upon the frequency components extracted by said extracting means;

said first vector quantizing means being adapted to perform vector quantization on every sub-block.

4. The apparatus according to claim 3, wherein said second vector quantizing means performs vector quantization in dependence upon correlation among said sub-blocks.

5. A coding method for coding input image data of every block of a predetermined size, comprising:

first vector quantizing step of vector-quantizing the input data and outputting L-bit vector quantized data;

second vector quantizing step of performing further vector quantization on m items of L-bit vector quantized data output in said first vector quantizing step, without expanding said m items of L-bit vector quantized data, and outputting n-bit vector quantized data (where n<L× m);

selecting step of exclusively selecting either said m items of L-bit vector quantized data or said n-bit vector quantized data based on a selection signal; and output step of outputting the m items of L-bit vector quantized data or the n-bit vector quantized data selected in said selecting step as a vector quantization result of the input image.

* * * * *

UNITED STATES PATENT AND TRADEMARK OFFICE
CERTIFICATE OF CORRECTION

PATENT NO. : 6,072,910  
DATED : June 6, 2000  
INVENTOR(S) : Mitsuru Maeda et al.

Page 1 of 2

It is certified that error appears in the above-identified patent and that said Letters Patent is hereby corrected as shown below:

Title page,
Under Item [56] References Cited, U.S. Patent Documents, please insert the following:
-- 4,965,580
   4,922,508
   4,853,779
   4,824,376
   4,772,946
   4,433,761
   4,700,399
   4,719,490
   4,887,151
   4,974,071
   4,845,559 --.

Under Item [56] References Cited, Other Publications,
please insert the following:
-- "Spatial Transform Coding Of Color Images", William K. Pratt, IEEE Transactions On Communication Technology, Vol. COM-19, No. 6, pgs. 980-992, December 1971.

"Image Compression Using A Nemel Network", IGARSS '83, Vol. 3, pgs. 1231-1238.
"Hierarchical Vector Quantization" in IEEE Proceedings: I. Solid State And Electronic Devices, Vol. 136, No. 6, pgs. 405-413.

"Composite Coding Of Color Video Signal With Vector In Quantization In The Transform Domain", Conference Report Of The Global Telecommunications Conference, Tokyo, Vol. 2/3, pgs. 1382-1386.

"Image Coding Using Vector Quantization" IEEE Transactions On Communications, Vol. 36, No. 8, pgs. 957-971.

"Image Sequence Coding Using Vector Quantization", IEEE Transactions on Communications, Vol. 34, No. 6, pgs. 703-710. --

Column 6,
Line 47, "X" should read -- X. --; and
Line 48, "/." should be deleted.

Column 7,
Equation (2), "$Y_{41}, Y_{43}, Y_{44})^T$" should read -- $Y_{41}, Y_{42}, Y_{43}, Y_{44})^T$ --.

UNITED STATES PATENT AND TRADEMARK OFFICE
CERTIFICATE OF CORRECTION

PATENT NO. : 6,072,910
DATED : June 6, 2000
INVENTOR(S) : Mitsuru Maeda et al.

It is certified that error appears in the above-identified patent and that said Letters Patent is hereby corrected as shown below:

Column 20,
Line 1, "$C_0 \in \{X_{0i)}{}_{(i=}1\text{-}8)$" should read -- $C_0 \in \{X_{0i}\} (i=1\text{-}8)$ --;
Line 6, "$X_{03} = \{1, 2, 1, 1\}$ --.

Column 21,
Line 23, "inputted-vectors" should read -- inputted vectors --.

Column 22,
Line 39, "book A" should read -- book A --;
Line 41, "book A: should read -- book A -- and "book B" should read -- book B --;
Line 43, "book N" should read -- book N --;
Line 45, "book C" should read -- book C --;
Line 49, "book B" should read -- book B --;
Line 50, "book N" should read -- book N --;
Line 52, "book C" should read -- book C --; and
Line 63, "212-a-121d" should read -- 212a-212d --.

Column 23,
Line 2, "book N" should read -- book N --;
Line 27, "C is" should read -- C is --;
Line 33, "book C" should read -- book C --; and
Line 36, "book C" should read -- book C --.

Signed and Sealed this

Twenty-seventh Day of November, 2001

*Attest:*

NICHOLAS P. GODICI
*Attesting Officer*     Acting Director of the United States Patent and Trademark Office

UNITED STATES PATENT AND TRADEMARK OFFICE
CERTIFICATE OF CORRECTION

PATENT NO.      : 6,072,910
DATED           : June 6, 2000
INVENTOR(S)     : Mitsuru Maeda et al.

It is certified that error appears in the above-identified patent and that said Letters Patent is hereby corrected as shown below:

<u>Title page,</u>
Item [56], References Cited, U.S. PATENT DOCUMENTS, please insert the following: -- 4,633,296 --.

FOREIGN PATENT DOCUMENTS, please insert the following:
-- Europe 0 276 603 --.

Signed and Sealed this

Twenty-first Day of January, 2003

JAMES E. ROGAN
*Director of the United States Patent and Trademark Office*